(12) United States Patent
Nemoto et al.

(10) Patent No.: US 6,456,344 B1
(45) Date of Patent: Sep. 24, 2002

(54) LCD HAVING A PATTERN FOR PREVENTING A WAVY BRIGHTNESS IRREGULARITY AT THE EDGES OF THE SCREEN DUE TO DRIVE ELEMENTS OR TAPE CARRIER PACKAGES

(75) Inventors: Atsushi Nemoto, Chiba (JP); Masumi Sasuga, Mobara (JP); Katsuhiko Shibata, Mobara (JP)

(73) Assignees: Hitachi, Ltd., Tokyo (JP); Hitachi Device Engineering Co., Ltd., Mobara (JP)

( * ) Notice: Subject to any disclaimer, the term of this patent is extended or adjusted under 35 U.S.C. 154(b) by 0 days.

(21) Appl. No.: 09/438,920

(22) Filed: Nov. 12, 1999

(30) Foreign Application Priority Data

Nov. 12, 1998 (JP) ............................................. 10-322306

(51) Int. Cl.⁷ ............................................. G02F 1/1335
(52) U.S. Cl. ............................ 349/64; 349/62; 349/150
(58) Field of Search .............................. 349/112, 113, 349/62, 63, 64, 65, 150, 192

(56) References Cited

FOREIGN PATENT DOCUMENTS

| JP | 10340612 A | * 12/1998 | ......... G02F/1/1335 |
| JP | 10340613 A | * 12/1998 | ......... G02F/1/1335 |

* cited by examiner

*Primary Examiner*—Kenneth Parker
*Assistant Examiner*—Andrew Schechter
(74) *Attorney, Agent, or Firm*—Antonelli, Terry, Stout & Kraus, LLP

(57) ABSTRACT

The present invention provides a liquid crystal display device which is capable of suppressing wavy brightness irregularity which occurs in a display screen edge portion in the vicinity of drivers or tape carrier packages (TCPs) on which the drivers are mounted, owing to the mounting of the drivers or the TCPs. In one example of the present invention, a wavy pattern for preventing brightness irregularity is partially formed along one edge of a light guide plate in the vicinity of drivers mounted on a substrate which constitutes a liquid crystal display panel. Similar effects and advantages are obtained even if this wavy pattern for preventing brightness irregularity is formed on a reflecting sheet arranged on the side of the liquid guide plate opposite to the liquid crystal display panel, or on a diffusion sheet inserted between the light guide plate and the liquid crystal display panel.

8 Claims, 17 Drawing Sheets

LCD HAVING A PATTERN FOR PREVENTING A WAVY BRIGHTNESS IRREGULARITY AT THE EDGES OF THE SCREEN DUE TO DRIVE ELEMENTS OR TAPE CARRIER PACKAGES

BACKGROUND OF THE INVENTION

1. Field of the Invention

The present invention relates to a liquid crystal display device and, more particularly, to an art for improving brightness irregularity on the display screen of the same.

2. Description of the Related Art

Liquid crystal display devices have been being widely spread as display terminals for information processing equipment (OA equipment) such as personal computers, because of their features of thin size and light weight as well as their high image quality which compares with Braun tubes.

Such a liquid crystal display device (i.e., a liquid crystal display module) includes, for example, transparent insulating substrates made from two glass plates or the like at least one of which has display electrodes formed on a surface confronting a surface of the other, both substrates being superposed on each other with a predetermined gap interposed therebetween. A liquid crystal sealing material is arranged in a frame-like shape (an approximately square shape) between the peripheral portions of this pair of substrates, thereby bonding both substrates to each other. A liquid crystal inlet is formed in a portion of this sealing material, and a liquid crystal (liquid crystal molecules) charged through this inlet is sealed in the inside of the sealing material between both substrates. Thus, the liquid crystal sealed between the substrates forms a liquid crystal layer. Polarizers each of which transmits only constant polarized light are arranged on the outside surfaces of both substrates (the surfaces of both substrates opposite to the liquid crystal layer), respectively. Thus, a liquid crystal display panel (also called liquid crystal element or LCD (liquid crystal display)) is finished. A light source (back light) for supplying light from the back surface of the liquid crystal display panel and displaying an image on the top surface of the liquid crystal display panel is arranged on the back surface (bottom surface) of the liquid crystal display panel. The back surface of the liquid crystal display panel represents the surface of the liquid crystal display panel opposite to a surface (front surface) thereof on which to display an image to be viewed by a user of the liquid crystal display device. Unless otherwise specified in the present specification, description will be given on the assumption that the view point (observation point) of the user is located above the liquid crystal display device.

A driving circuit board for applying a voltage according to a display image signal to the aforementioned display electrodes is arranged outside the periphery of the liquid crystal display panel. The above-described liquid crystal display panel and back light are accommodated and held in a plastic-molded case. Moreover, all of these members as well as the molded case are accommodated in a metal-made upper shield case, a metal-made lower shield case and the like, the upper shield case having a display window (which exposes the display area of the top surface of the liquid crystal display panel to the user). Thus, the liquid crystal display device is assembled.

For example, in an active matrix type of liquid crystal display panel, a gate line group and a drain line group are formed over a liquid crystal-side main surface of either one of two transparent insulating substrates made of glass or the like which are arranged to confront each other with the aforementioned liquid crystal layer interposed therebetween. The gate line group is formed to be extended in the x direction and to be juxtaposed in the y direction (in a direction intersecting the x direction), while the drain line group is insulated from the gate line group and is formed to be extended in the y direction and to be juxtaposed in the x direction.

The areas surrounded by the gate lines and the drain lines constitute pixel areas, respectively, and switching elements such as a thin film transistor (TFT) and a transparent pixel electrode are formed in each of the pixel areas.

When a scanning signal is supplied to a gate line, a thin film transistor is turned on and a video signal from a drain line is supplied to a pixel electrode via this thin film transistor which has been turned on.

Each of the drain lines of the drain line group and each of the gate lines of the gate line group are formed to be extended into at least particular peripheral portions of the transparent insulating substrate, respectively, thereby constituting external terminals in the respective peripheral portions. A plurality of driver ICs (semiconductor integrated circuits) provided with video driving circuits and a plurality of driver ICs which constitute gate scanning driving circuits are externally attached to the periphery of the substrate on which the external terminals are formed. The respective external terminals of the drain line group are connected to the video driving circuits. For this reason, the drain lines are also called video signal lines. The respective external terminals of the gate line group are connected to the gate scanning driving circuits. For this reason, the gate lines are also called scanning signal lines. The aforementioned plurality of driver ICs are respectively mounted on tape carrier packages (TCPs) and are externally attached to the periphery of the substrate.

In this construction in which TCPs provided with driver ICs are externally attached to the periphery of the transparent insulating substrate, the area (generally called "picture frame") occupied by the region between the contour of a display area defined by the area of intersection of the gate line group and the drain line group of the transparent insulating substrate and the contour of the external frame of the transparent insulating substrate becomes larger by the area required to arrange such circuits. On the other hand, there has recently been a growing demand for liquid crystal display modules having smaller external dimensions (liquid crystal display panels having higher densities and as small external dimensions as possible).

Accordingly, in order to make the width of such picture frame as small as possible, it has been proposed to provide a construction in which video driving ICs and gate scanning driving ICs are directly mounted on a transparent insulating substrate without the use of TCP components. This mounting scheme is called the Flip-Chip-Attachment (FCA) scheme or the Chip-On-Glass (COG) scheme (both schemes will be hereinafter referred to as the FCA scheme).

A liquid crystal display device based on this FCA scheme is described in, for example, Japanese Patent Laid-Open No. 122806/1996.

SUMMARY OF THE INVENTION

FIG. 18 is a schematic front view of a conventional liquid crystal display panel based on the FCA scheme, illustrating wavy brightness irregularity which appears on the display screen of the same.

In FIG. 18, symbol PNL denotes a liquid crystal display panel, symbol SUB1 a lower transparent glass substrate which constitutes part of the liquid crystal display panel PNL, symbol SUB2 an upper transparent glass substrate which constitutes part of the same, symbol ICG a gate driver (a gate line driving IC), symbol ICD a drain driver (a drain line driving IC), and symbol LP a linear light source such as a cold-cathode fluorescent tube. A plurality of gate drivers ICG and drain drivers ICD are directly mounted on an edge portion of the transparent glass substrate SUB1.

In the conventional liquid crystal display device, there has been the problem that a wavy brightness irregularity WBU as shown in FIG. 18 occurs on the display screen of the liquid crystal display panel PNL in the vicinity of the drivers ICG and ICD mounted on the substrate SUB1 and the display quality of the liquid crystal display panel PNL lowers. The wavy brightness irregularity which makes the display screen wavily bright (white) along the periphery thereof is whitely conspicuous during a black display in particular. This wavy brightness irregularity occurs between mutually adjacent drivers as shown in FIG. 18 by way of example. The occurrence of the wavy brightness irregularity WBU is more remarkable at a location closer to the light source LP as well as in the case of high brightness. This brightness irregularity occurs after the step of mounting the drivers. The drivers are mounted by using, for example, an anisotropic conductive layer or an ultraviolet rays hardening resin. According to an investigation made by the present inventors, it is considered that the glass substrate is strained by exposure to heat or pressure during the mounting of the drivers, whereby the above-described brightness irregularity occurs. Incidentally, not only in the FCA scheme but also in the TCP scheme, such wavy brightness irregularity occurs at similar locations due to the mounting of TCPs.

FIG. 19 is a schematic front view showing a conventional diffusion sheet or reflecting sheet. Symbol SPS-RFS denotes a diffusion sheet or a reflecting sheet, and symbol BP denotes a strip-shaped print pattern.

Conventionally, to suppress the occurrence of the brightness irregularity, the strip-shaped (rectangular) print pattern BP has been formed on the top surface of the diffusion and the reflecting sheet (SPS-RFS) at a location where the wavy brightness irregularity WBU occurs. This strip-shaped print pattern BP is a solid pattern or a gradation pattern which becomes lower in print density toward its edge distant from the edge of the sheet (i.e., the drivers), i.e., closer to the middle of each of the sheets.

However, this prior art has the problem that because the patterns printed on the diffusion sheet and the reflecting sheet are strip-shaped, brightness lowers at a location where the patterns are formed, or wavy brightness irregularity appears in the case of high brightness.

An object of the present invention is to provide a liquid crystal display device which is capable of suppressing the occurrence of wavy brightness irregularity which occurs in a display screen edge portion in the vicinity of drivers or TCPs due to the mounting thereof.

To solve the above-described problems, the liquid crystal display device according to the present invention is characterized by comprising: a liquid crystal display panel having two substrates superposed on each other, a liquid crystal sealed between both substrates and drivers or TCPs mounted on an edge portion of the substrates; a light guide plate arranged on the back surface of the liquid crystal display panel; a linear light source arranged on one side of the light guide plate; a diffusion sheet arranged on the top surface of the light guide plate; and a reflecting sheet arranged on the bottom surface ,of the light guide plate, a pattern for preventing brightness irregularity being partially formed along at least one edge of at least one of the light guide plate, the diffusion sheet and the reflecting sheet near (in the vicinity of) the drivers or the TCPs.

The pattern formed on the light guide plate or the diffusion sheet has a wavy shape which is, for example, convex toward the middle portion of the liquid crystal display panel.

In addition, one example of the pattern is characterized by a gradation pattern whose density gradually varies.

Moreover, the pattern formed on the diffusion sheet or the reflecting sheet is a gradation pattern which is low in density in the vicinity of its contour excluding the bottom side of the pattern which is in contact with the one edge.

In the present invention, by arranging the pattern according to the location, shape and brightness of wavy brightness irregularity which occurs on the display screen due to the mounting of the drivers or the TCPs, it is possible to cancel the wavy brightness irregularity by lowering the brightness thereof and eliminate the difference in contrast between a portion in which the wavy brightness irregularity occurs and a portion in which the wavy brightness irregularity does not occur. Accordingly, it is possible to reduce brightness irregularity.

These and other objects, features and advantages of the present invention will become more apparent from the following description when taken in conjunction with the accompanying drawings.

BRIEF DESCRIPTION OF THE DRAWINGS

FIG. 15B is a cross-sectional view of a portion corresponding to line B–B' of FIG. 10;

DETAILED DESCRIPTION

Embodiments of the present invention will be described below in detail with reference to the accompanying drawings. Incidentally, in drawings which will be referred to in the following description, portions having the same functions are denoted by the same symbols, and a repetitive description of such portions is omitted herein.

<<Entire Construction of Liquid Crystal Display Module MDL>>

Figure 10:
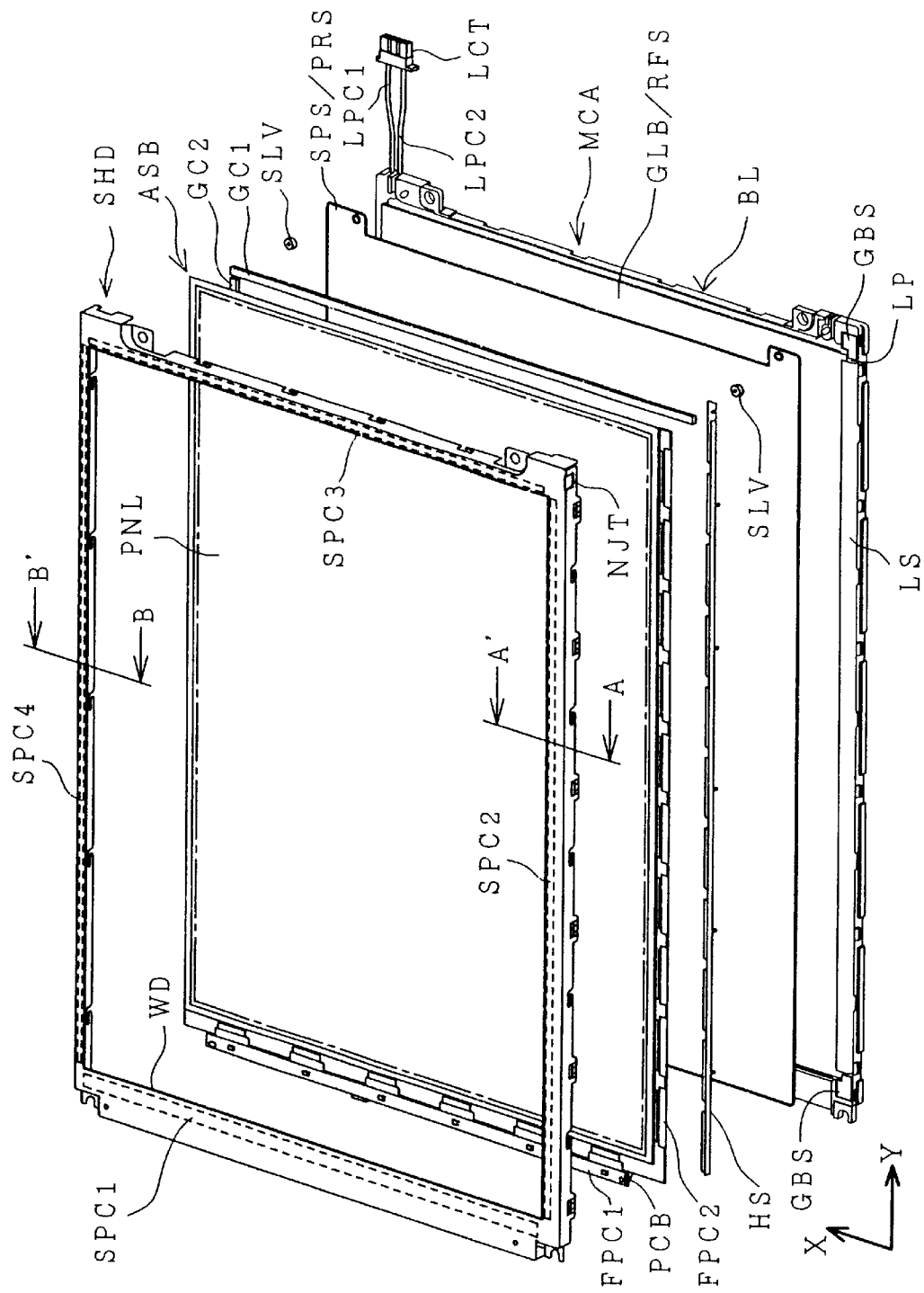
FIG. 10 is an exploded perspective view of one example of a liquid crystal display module to which the present invention is applied.

FIG. 10 is an exploded perspective view of one example of a vertical electric field type of active matrix FCA scheme liquid crystal display module MDL.

Symbol SHD denotes a shield case (also called a metal frame), symbol WD a display window, symbols SPC1 to SPC4 insulating spacers, symbols FPC1 and FPC2 bent multilayered flexible circuit boards (symbols FPC1 and FPC2 denote a gate side circuit board and a drain side circuit board, respectively), symbol PCB denotes an interface circuit board, symbol ASB denotes an assembled liquid crystal display panel having driving circuits, symbol PNL a liquid crystal display panel (also called a liquid crystal display element or LCD) which includes two transparent insulating substrates superposed on each other with driver ICs being mounted on either one of the two, symbols GC1 and GC2 rubber cushions, symbol PRS a prism sheet (two prism sheets), symbol SPS a diffusion sheet, symbol GLB a light guide plate, symbol RFS a reflecting sheet, symbol MCA a lower case (molded case) formed by integral molding, symbol LP a fluorescent tube, symbol LPC a lamp cable, symbol LCT a connector for connection to an inverter, and symbols GB rubber bushes which supports the fluorescent tube LP. These individual members are stacked in the layered arrangement shown in FIG. 10 to assemble the liquid crystal display module MDL.

The module MDL includes two kinds of accommodating/holding members, the lower case MCA and the shield case SHD.

Four mounting holes are formed in the module MDL so that the module MDL is mounted as a display part on an information processing apparatus such as a personal computer or a word processor. The mounting holes of the shield case SHD are formed at positions which coincide with the mounting holes of the lower case MCA, and the module MDL is mounted on the information processing apparatus in the state of being secured thereto with screws or the like being fitted through the mounting holes of both cases. In the module MDL, an inverter for backlighting is arranged in a side portion of the screen of the information processing apparatus, and electric power is supplied to a back light BL via the connector LCT and the lamp cable LPC. Signals and the required electric power from a host computer (host) are respectively supplied to a controller part and a power supply part of the liquid crystal display module MDL via an interface connector CT1 positioned on the reverse side of the module MDL.

Figure 16:
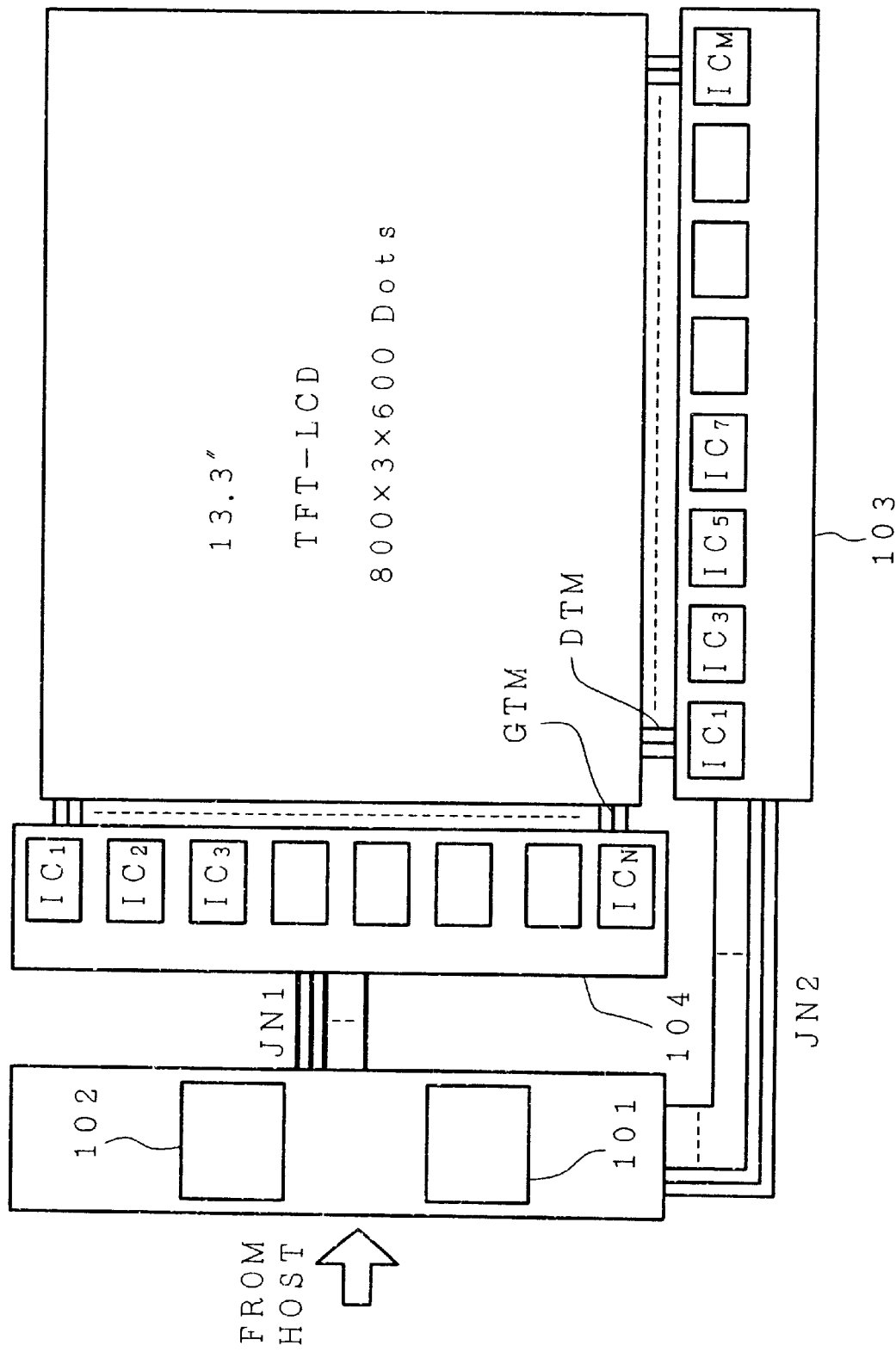
FIG. 16 is a block diagram showing a liquid crystal display panel of a liquid crystal display module and circuits arranged around the periphery of the liquid crystal display panel.

FIG. 16 is a block diagram showing a TFT liquid crystal display panel of the TFT liquid crystal display module shown in FIG. 10 and circuits arranged along a peripheral portion of the panel. In this example, drain drivers IC1 to ICM and gate drivers IC1 to ICN are chip-on-glass-mounted (COG-mounted) with drain side terminal lines DTM and gate side terminal lines GTM as well as an anisotropic conductive layer or an ultraviolet rays hardening resin layer or the like, all of which are formed on either one of the transparent insulating substrates of the liquid crystal display panel. This example is applied to a liquid crystal display panel having 1024×3×768 effective dots which support for XGA specifications (pixel size=307.5 $\mu$m×307.5 $\mu$m). For this reason, ten (M=10) 240-output drain driver ICs and six 101- and 100-output (N=6) gate driver ICs are COG-mounted along one longer side and one shorter side of the transparent insulating substrate of the liquid crystal display panel, respectively. A drain driver part 103 is arranged on the bottom side of the liquid crystal display panel and a gate driver part 104 is arranged on the left side of the liquid crystal display panel, and a controller part 101 and a power supply part 102 are also arranged on the same left side. The controller part 101 and the power supply part 102 are interconnected to the drain driver part 103 and to the gate driver part 104 by electrical connecting means JN2 and JN1, respectively. Incidentally, the controller part 101 and the power supply part 102 are arranged on the reverse side of the gate driver part 104.

A specific construction of each of the constituent components will be described below in detail with reference to FIGS. 1 to 17.

<<Back light BL>>

A side light type of back light BL which illuminates the liquid crystal display panel PNL from the back side thereof is made of one cold-cathode fluorescent tube LP, a lamp cable LPC of the fluorescent tube LP, two rubber bushes GB which hold the lamp cable LPC of the fluorescent tube LP, the light guide board GLB, the diffusion sheet SPS which is arranged in contact with the entire top surface of the light guide board GLB, the reflecting sheet RFS which is arranged over the entire bottom surface of the light guide board GLB, and two prism sheets PRS which are arranged in contact with the entire top surface of the diffusion sheet SPS. Optical diffusion dotted patterns and wavy patterns for preventing wavy brightness irregularity, both of which are formed on the bottom surface of the light guide board GLB, will be described later.

After the fluorescent tube LP has been arranged on a reflecting sheet LS, the reflecting sheet LS is rolled to be bent by 180 degrees, and is bonded at its edge portions to the bottom end portion of the light guide board GLB with double-faced adhesive tape BAT having an adhesive (refer to FIG. 15A).

<<Diffusion Sheet SPS>>

The diffusion sheet SPS is disposed over the light guide board GLB, and diffuses light emitted from the top surface of the light guide board GLB and uniformly illuminates the liquid crystal display panel PNL with light. The wavy patterns for preventing wavy brightness irregularity will be described later.

<<Prism Sheet PRS>>

The prism sheet PRS is disposed over the diffusion sheet SPS, and has a bottom surface formed as a smooth surface and a top surface formed as a prism surface. The prism surface is made of, for example, a plurality of grooves each having a V-shaped cross section and arranged in parallel straight lines (that is to say, a multiplicity of triangular prisms arranged in parallel). The prism sheet PRS can increase the brightness of the back light BL by gathering light diffused from the diffusion sheet SPS over a wide angular range, in a direction normal to the prism sheet PRS. Accordingly, the back light BL can be reduced in power consumption so that the module MDL can be reduced in size and weight to decrease manufacturing costs. Incidentally, if two prism sheets PRS are to be used, the two prism sheets PRS are superposed on each other so that the extending directions of grooves of the two prism sheets PRS cross each other at right angles.

<<Reflecting Sheet RFS>>

The reflecting sheet RFS is arranged below the light guide board GLB, and reflects light emitted from the bottom surface of the light guide board GLB, toward the liquid crystal display panel PNL. The patterns for preventing wavy brightness irregularity will be described later.

<<Prevention of Wavy Brightness Irregularity by Light Guide Plate GLB>>

FIGS. 1 to 4 are schematic front views of the light guide board GLB and show different wavy patterns GWP for preventing wavy brightness irregularity, each of which is provided on the light guide board GLB according to the embodiments of the present invention.

Figure 1:
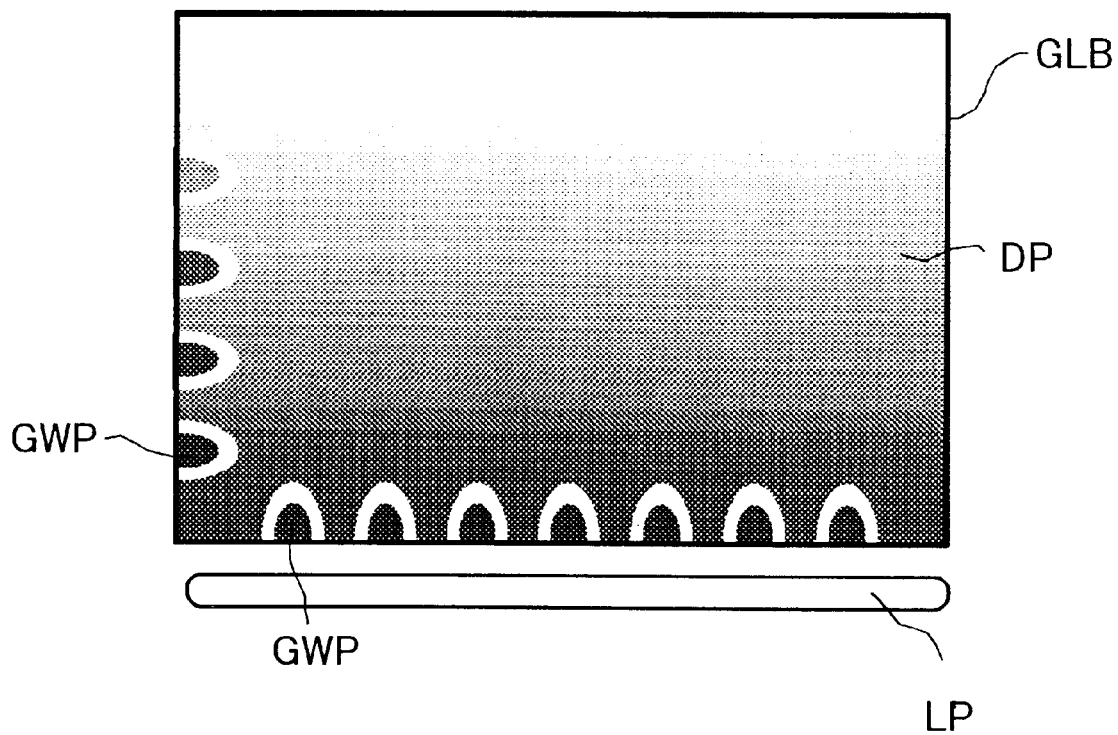
FIG. 1 is a schematic front view of a light guide board GLB provided with wavy patterns GWP for preventing wavy brightness irregularity, in an embodiment of the present invention in which a fluorescent tube LP is arranged on the side of drain drivers.
Figure 2:
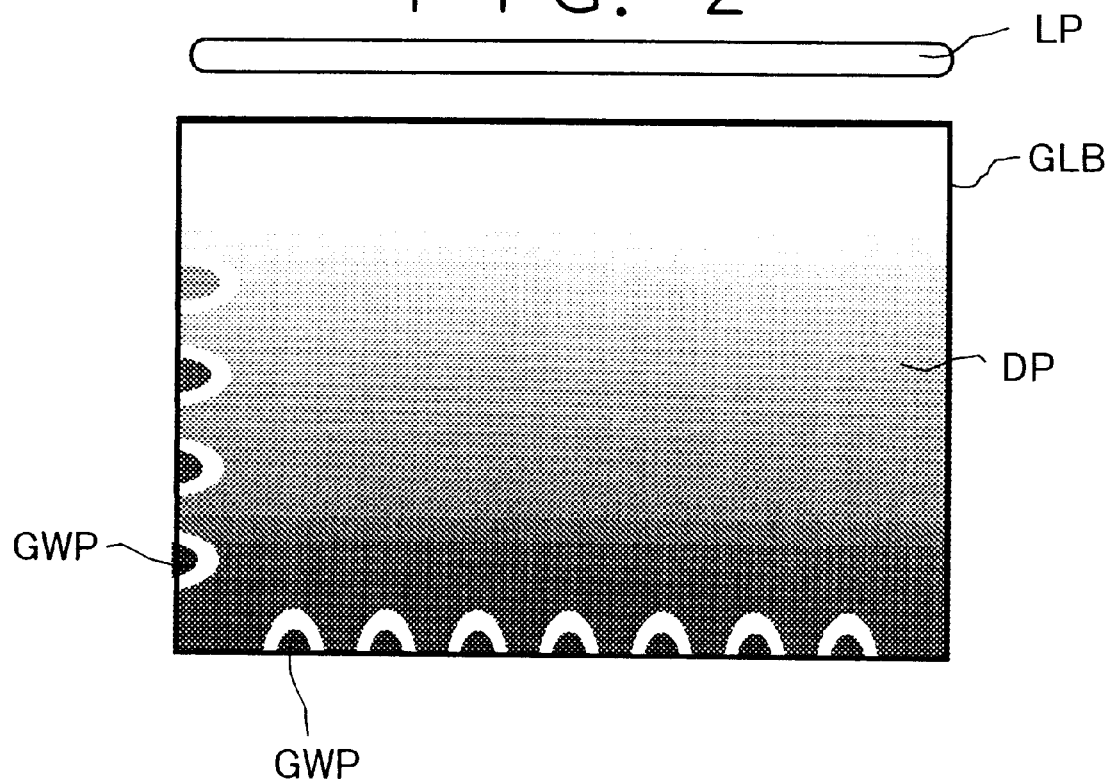
FIG. 2 is a schematic front view of the light guide board GLB provided with the wavy patterns GWP for preventing wavy brightness irregularity, in another embodiment of the present invention in which the fluorescent tube LP is arranged on the side opposite to the drain drivers.
Figure 3:
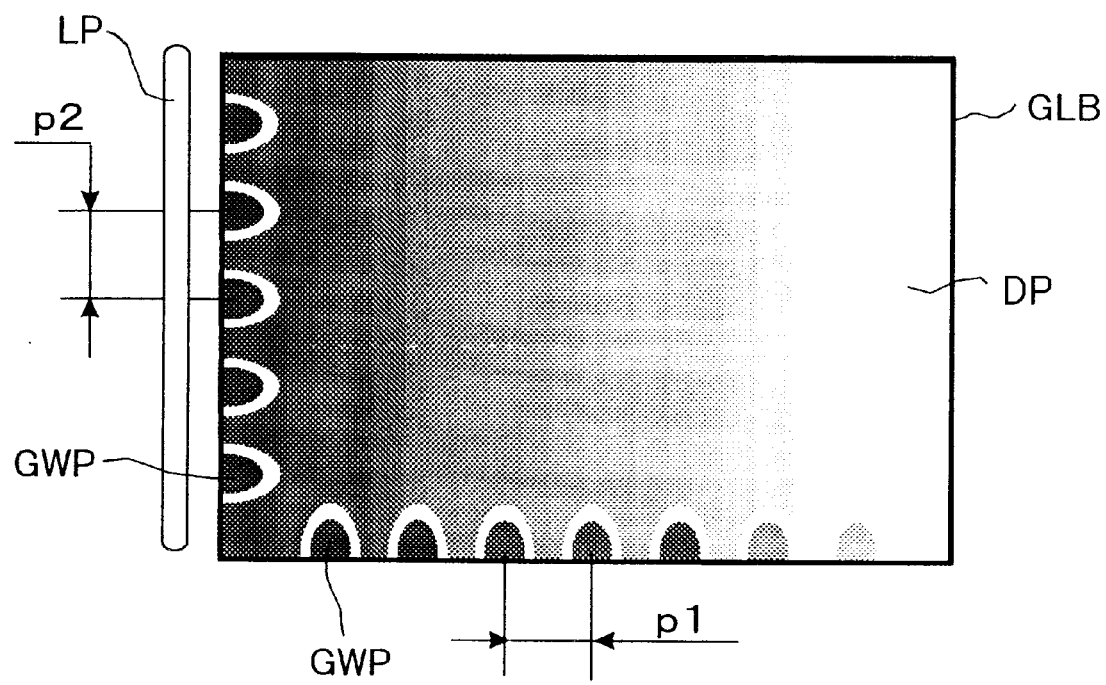
FIG. 3 is a schematic front view of the light guide board GLB provided with the wavy patterns GWP for preventing wavy brightness irregularity, in another embodiment of the present invention in which the fluorescent tube LP is arranged on the side of gate drivers.
Figure 4:
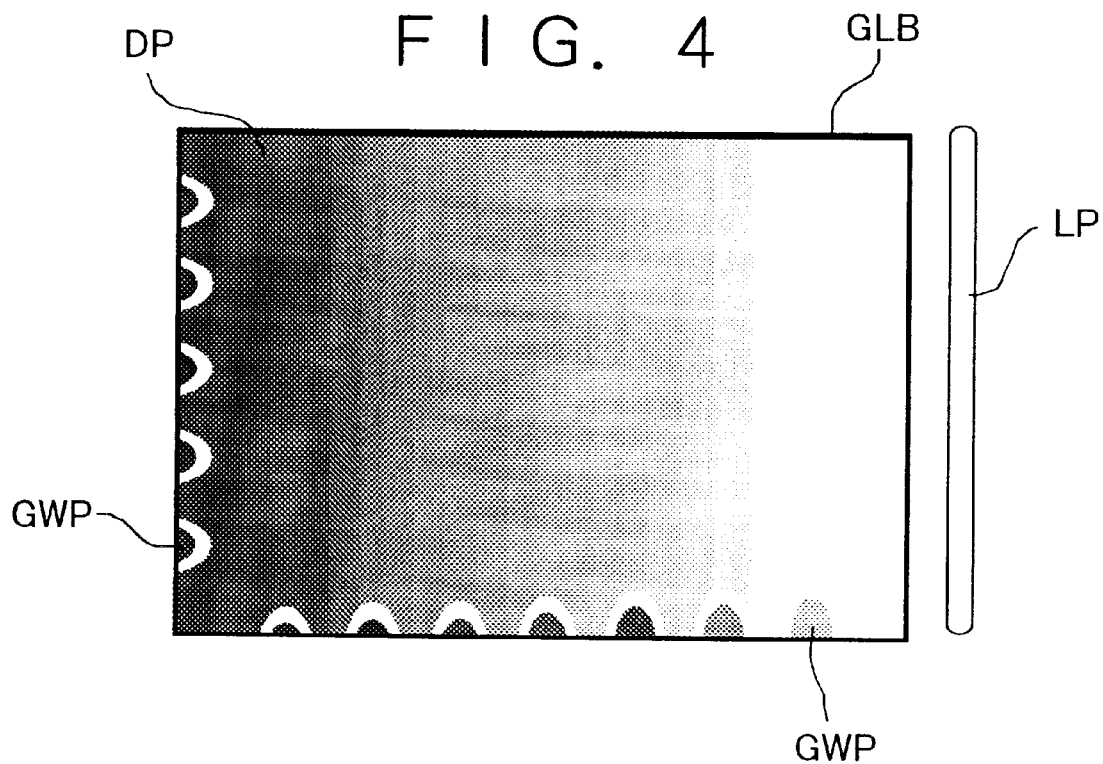
FIG. 4 is a schematic front view of the light guide board GLB provided with the wavy patterns GWP for preventing wavy brightness irregularity, in another embodiment of the present invention in which the fluorescent tube LP is arranged on the side opposite to the gate drivers.
Figure 5A:
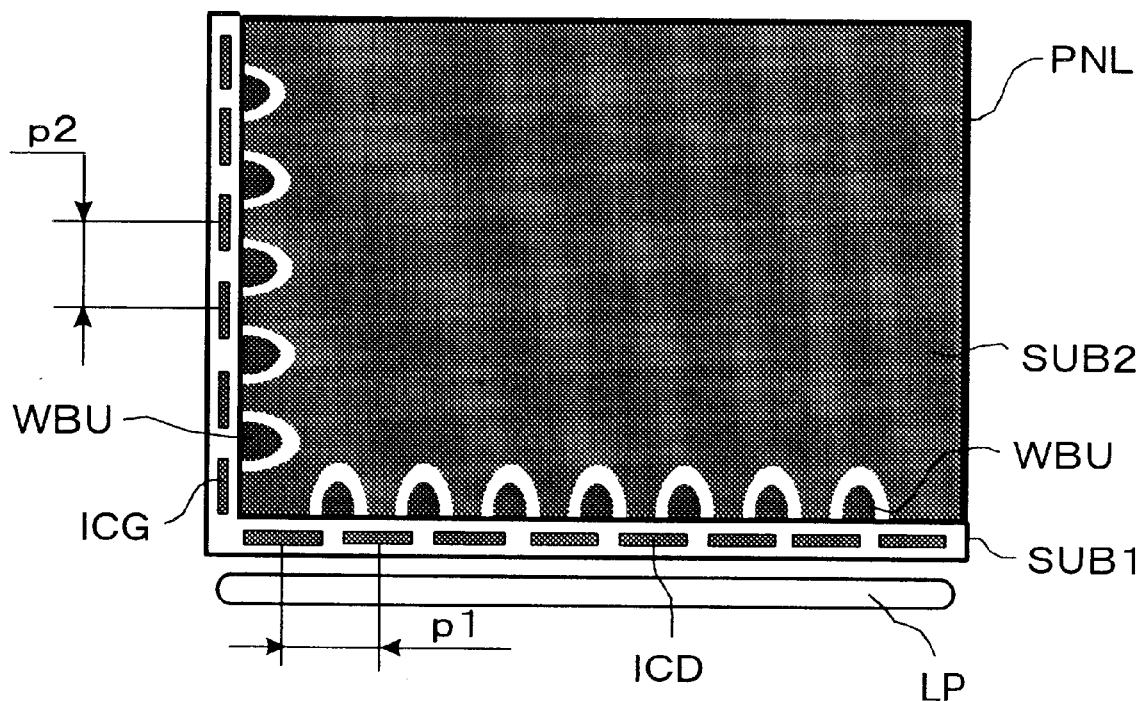
FIG. 5A is a schematic front view of an FCA-scheme liquid crystal display panel PNL which has the fluorescent tube LP arranged on the side of drain drivers.

In each of FIGS. 1 to 4, the drain drivers are provided on the bottom side of the light guide board GLB, and the gate drives are provided on the left side of the same (refer to FIG. 5A). FIG. 1 shows a case in which the fluorescent tube LP is arranged on the bottom side of the light guide board GLB, i.e., on the side of the drain drivers. FIG. 2 shows a case in which the fluorescent tube LP is arranged on the top side of the light guide board GLB, i.e., on the side opposite to the drain drivers. FIG. 3 shows a case in which the fluorescent tube LP is arranged on the left side of the light guide board GLB, i.e., on the side of the gate drivers. FIG. 4 shows a case in which the fluorescent tube LP is arranged on the right side of the light guide board GLB, i.e., on the side opposite to the gate drivers.

In FIGS. 1 to 4, symbol DP denotes an optical diffusion dotted pattern provided on the bottom surface of the light guide board GLB. Light which has entered the light guide board GLB from the fluorescent tube LP is guided in the light guide board GLB while being totally reflected owing to the difference in refractive index between air and the light guide board GLB. In order that the thus-guided light be allowed to exit from the top surface of the light guide board GLB by diffuse reflection, the white dotted patterns DP formed of a plurality of prints for optical diffusion which have higher refractive indexes than the light guide board GLB are formed and arranged on the bottom surface of the light guide board GLB. Incidentally, instead of the printed dotted patterns DP, holes, grooves or convex portions may also be formed integrally with the bottom surface of the light guide board GLB.

Figure 18:
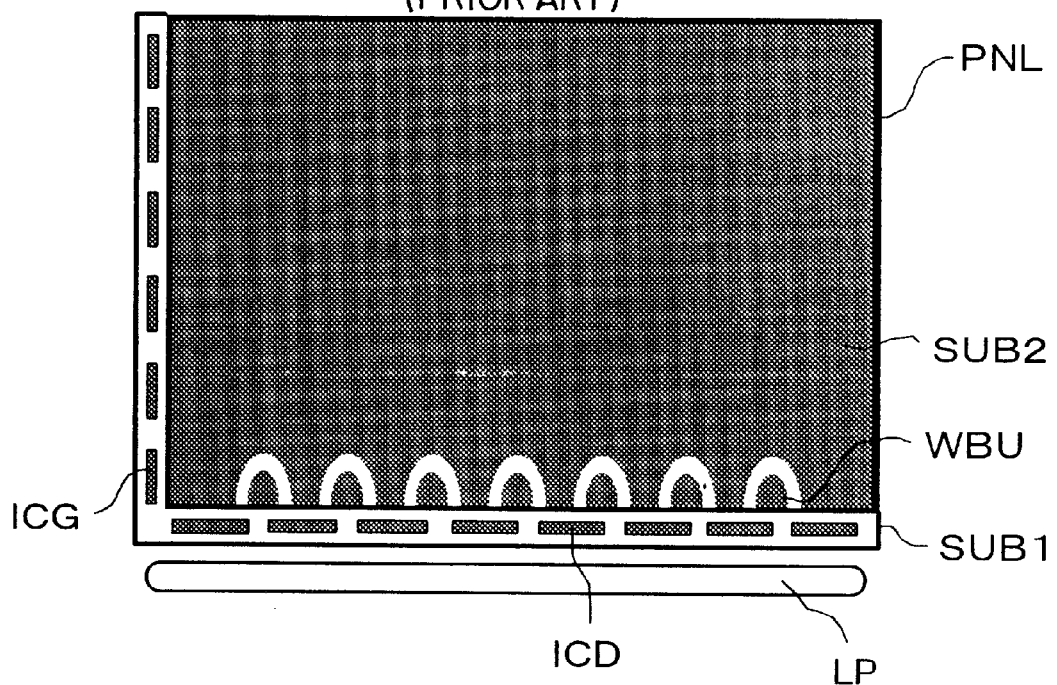
FIG. 18 is a schematic front view of a conventional liquid crystal display panel based on an FCA scheme, illustrating wavy brightness irregularity which appears on the display screen of the same.
Figure 19:
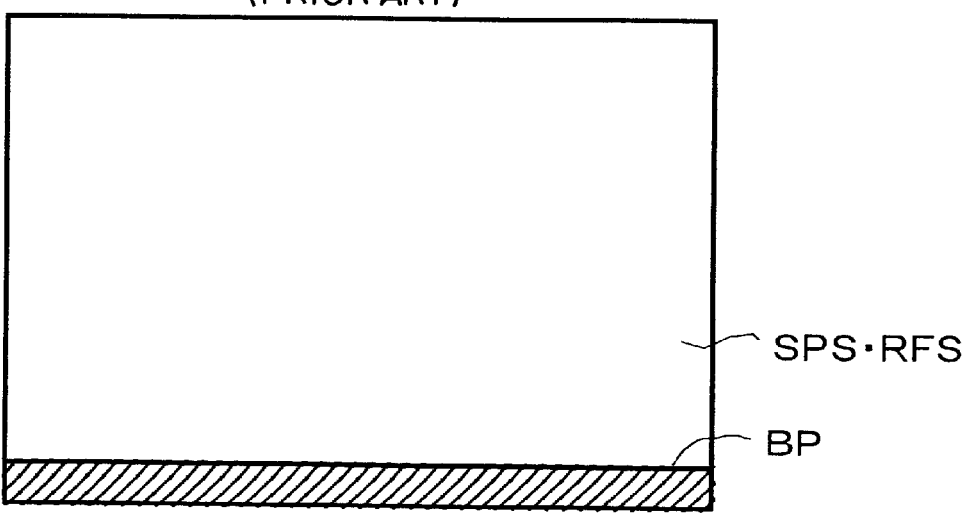
FIG. 19 is a schematic front view showing a conventional diffusion sheet or reflecting sheet.

Symbols GWP denote the wavy patterns for preventing wavy brightness irregularity which are provided on the bottom surface of the light guide board GLB. As described previously, there has heretofore been the problem that a wavy brightness irregularity occurs on the display screen of the liquid crystal display panel PNL in the vicinity of the drivers ICG and ICD mounted on the substrate SUB1 (refer to FIG. 18) and the display quality of the liquid crystal display panel PNL lowers. The wavy brightness irregularity which makes the display screen wavily bright along the periphery thereof is whitely conspicuous during a black display in particular. This wavy brightness irregularity occurs between mutually adjacent drivers (ICD and ICG).

Recently, in Japanese Patent Laid-Open Nos. 340612/1998 and 340613/1998, the art of forming patterns to cause them to confront individual drivers (drive LSIs) has been introduced as an art which solves brightness irregularity. However, from an investigation made by the present inventors, it has been found out that, as compared with the patterns formed in this manner, if a pattern for preventing brightness irregularity is formed in such a manner as to correspond to the region between the adjacent one pair of the above-described plurality of drivers (gate drivers or drain drivers), it is possible to decrease brightness irregularity with good efficiency (without impairing the brightness of the display screen). The patterns for preventing brightness irregularity are formed at intervals equal to those of the drivers, but the positions of the patterns are shifted by an amount equivalent to a predetermined dimension (for example, half the interval).

Figure 5B:
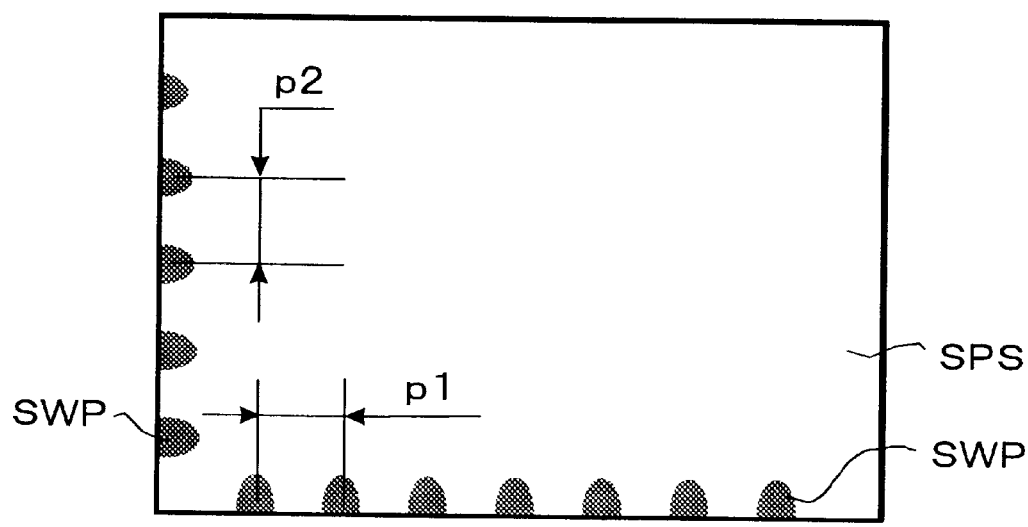
FIG. 5B is a schematic front view of a diffusion sheet SPS provided with other wavy patterns SWP for preventing wavy brightness irregularity according to the present embodiment.

In the portion of the light guide board GLB that corresponds to a location where wavy brightness irregularity occurs, the wavy patterns GWP for preventing wavy brightness irregularity are formed according to the shape of the wavy brightness irregularity which occurs (refer to FIG. 5B). Each of the wavy patterns GWP has a wavy shape which is convex toward the middle portion of the liquid crystal display panel PNL. The wavy patterns GWP are constituted of dots printed with, for example, white ink similarly to the above-described constitution of the optical diffusion dotted patterns DP (the constitution of dots will be described later in detail). Incidentally, in FIGS. 1 to 4, the boundaries between the wavy patterns GWP and the optical diffusion dotted patterns DP are drawn with white lines to clarify the illustration of such boundaries.

The occurrence of wavy brightness irregularity is more remarkable at a location closer to the fluorescent tube LP. Accordingly, the wavy patterns GWP are larger at locations closer to the fluorescent tube LP, on the left side of each of the light guide boards GLB of FIGS. 1 and 2 as well as on the bottom side of each of the light guide boards GLB of FIGS. 3 and 4. In addition, the respective wavy patterns GWP shown in FIGS. 2 and 4 are formed to be smaller than those shown in FIGS. 1 and 3, because the bottom side of the light guide board GLB shown in FIG. 2 and the left side of the light guide board GLB shown in FIG. 4 are distant from the respective fluorescent tubes LP compared to FIGS. 1 and 3, respectively.

Although not clearly shown in any of FIGS. 1 to 4, on the bottom surface of the light guide board GLB, the optical diffusion dotted patterns DP each having, for example, a round shape become larger in size and higher in density at locations more distant from the fluorescent tube LP so that more light can exit from the optical diffusion dotted patterns DP at such more distant locations, whereby light can uniformly exit from the entire top surface of the light guide board GLB.

Although not clearly shown, the wavy patterns GWP are also formed of small dotted patterns each having, for example, a round shape, and the dots inside of each of the wavy patterns GWP are, for example, formed to be smaller in size and (or) lower in density than the neighboring optical diffusion dotted patterns DP and to become gradually smaller at locations more distant from the neighboring optical diffusion dotted patterns DP. What is important is that the wavy patterns GWP are formed to lower the brightness of a wavy brightness irregularity compared to the optical diffusion dotted patterns DP, thereby canceling the wavy brightness irregularity and preventing diffusion of light. For example, the arrangement of the centers of the respective wavy patterns (for example, the portions of the respective wavy patterns that are prolonged or widened to the greatest extent in the display area) is shifted from the arrangement of the centers of the respective above-described juxtaposed plural drivers. In this case, the arrangement of the centers of the respective wavy patterns and the arrangement of the centers of the respective drivers are defined along the side of the substrate on which the drivers are arranged.

In FIG. 3, symbol p1 denotes the interval between the adjacent wavy patterns GWP on a longer side (or the interval between adjacent drain drivers) and symbol p2 denotes the interval between the wavy patterns GWP on a shorter side (or the interval between adjacent gate drivers), and the interval between the adjacent wavy patterns GWP and the interval between adjacent drivers coincide with each other (this relationship similarly applies to FIGS. 1 through 8).

In this manner, the wavy patterns GWP are arranged according to the location, shape and brightness of a wavy brightness irregularity which occurs on the display screen due to the mounting of drivers (or TCPs), while taking account of a location at which to arrange the fluorescent tube LP. Accordingly, the wavy brightness irregularity is canceled by being lowered in brightness, whereby it is possible to eliminate the difference in contrast between a portion in which the wavy brightness irregularity occurs and a portion in which the wavy brightness irregularity does not occur. Therefore, it is possible to reduce brightness irregularity and improve the display quality of the screen of the liquid crystal display device.

<<Prevention of wavy brightness Irregularity by Diffusion Sheet SPS and Reflecting Sheet RFS>>

Figure 5C:
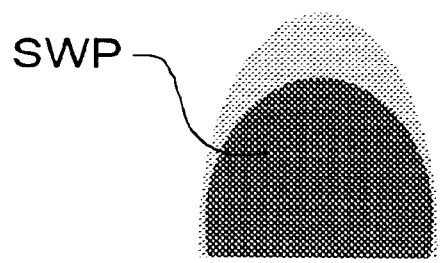
FIG. 5C is a schematic enlarged view of the wavy patterns SWP of FIG. 5B.
Figure 5D:
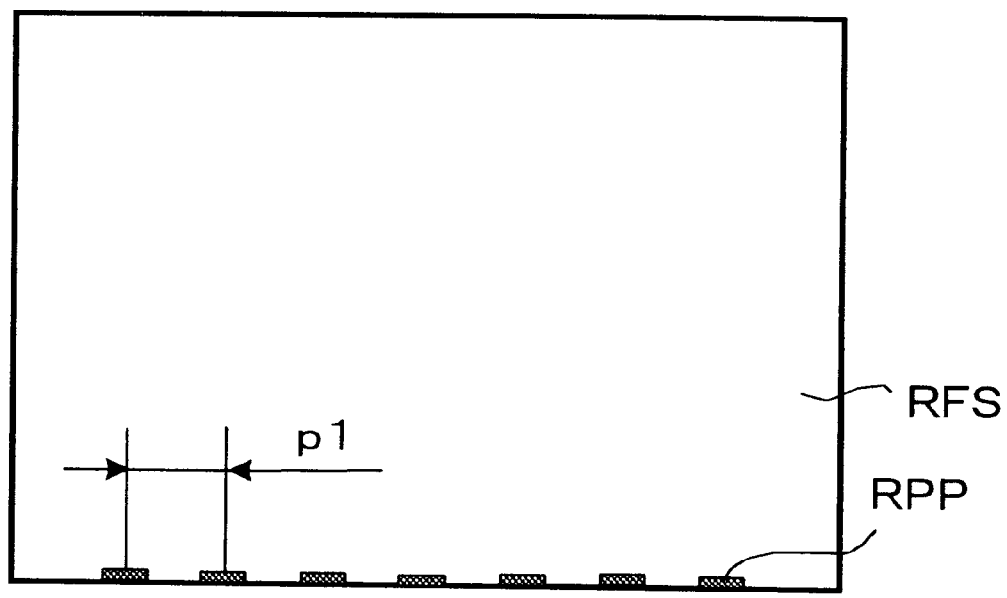
FIG. 5D is a schematic front view of a reflecting sheet RFS provided with wavy brightness irregularity preventing patterns RPP according to the present embodiment.

FIG. 5A is a schematic front view of the FCA-scheme liquid crystal display panel PNL which has the fluorescent tube LP arranged on its bottom side (on the side of drain drivers), FIG. 5B is a schematic front view showing wavy patterns SWP for preventing wavy brightness irregularity which are arranged on the diffusion sheet SPS according to the present embodiment, FIG. 5C is a schematic enlarged view showing the gradation pattern of one of the wavy patterns SWP shown in FIG. 5B, and FIG. 5D is a schematic front view showing wavy brightness irregularity preventing patterns RPP arranged on the reflecting sheet RFS according to the present embodiment.

Figure 6A:
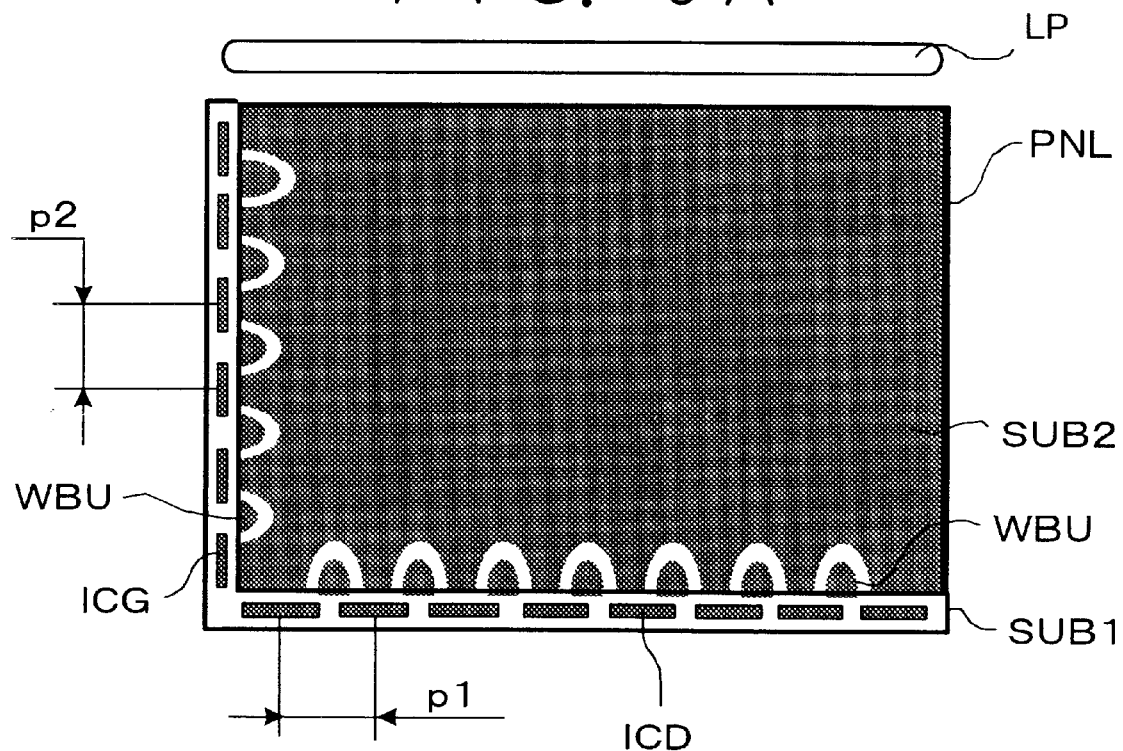
FIG. 6A is a schematic front view of the liquid crystal display panel PNL which has the fluorescent tube LP arranged on the side opposite to the drain drivers.
Figure 6B:
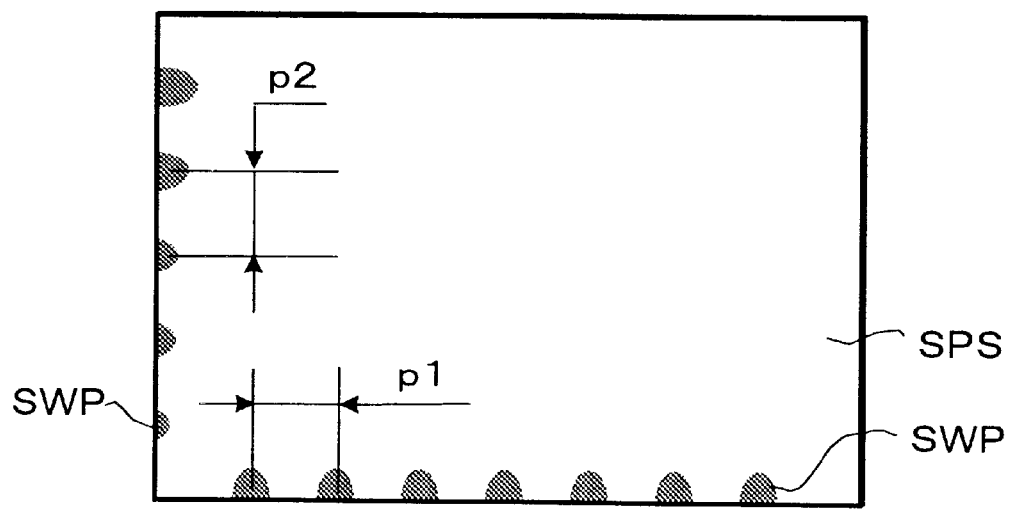
FIG. 6B is a schematic front view of the diffusion sheet SPS provided with other wavy patterns SWP for preventing wavy brightness irregularity according to the present invention.

FIG. 6A is a schematic front view of the liquid crystal display panel PNL which has the fluorescent tube LP arranged on its top side (on the side opposite to the drain drivers), and FIG. 6B is a schematic front view of the diffusion sheet SPS provided with the wavy patterns SWP for preventing wavy brightness irregularity according to the present embodiment.

Figure 7A:
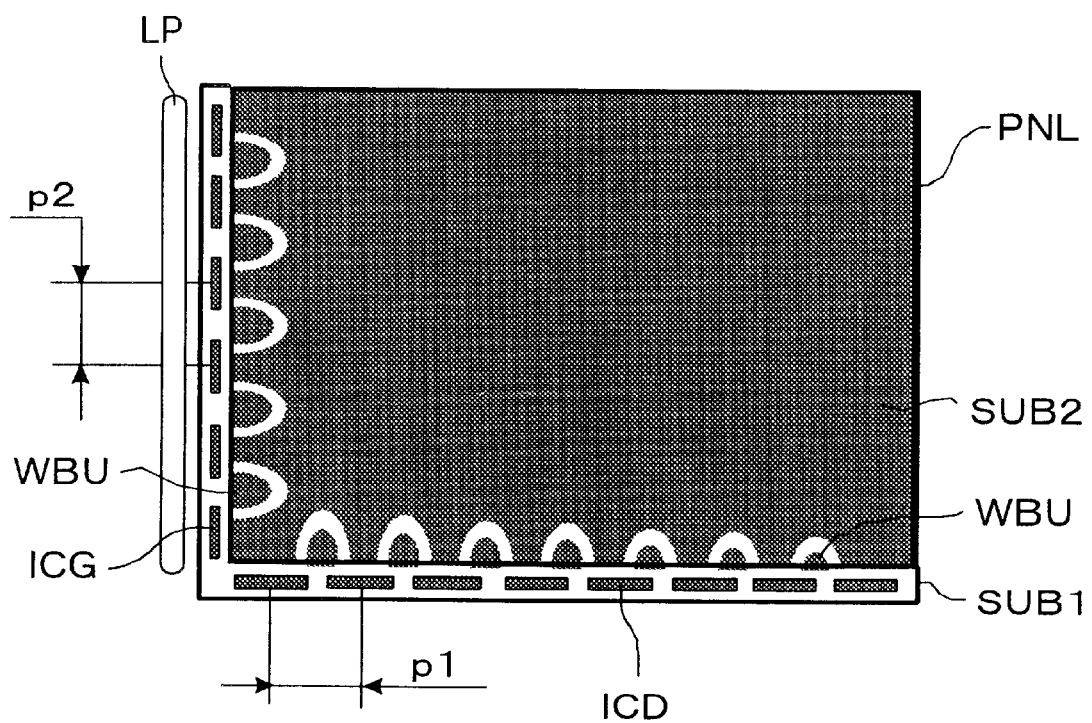
FIG. 7A is a schematic front view of the liquid crystal display panel PNL which has the fluorescent tube LP arranged on the side of gate drivers.
Figure 7B:
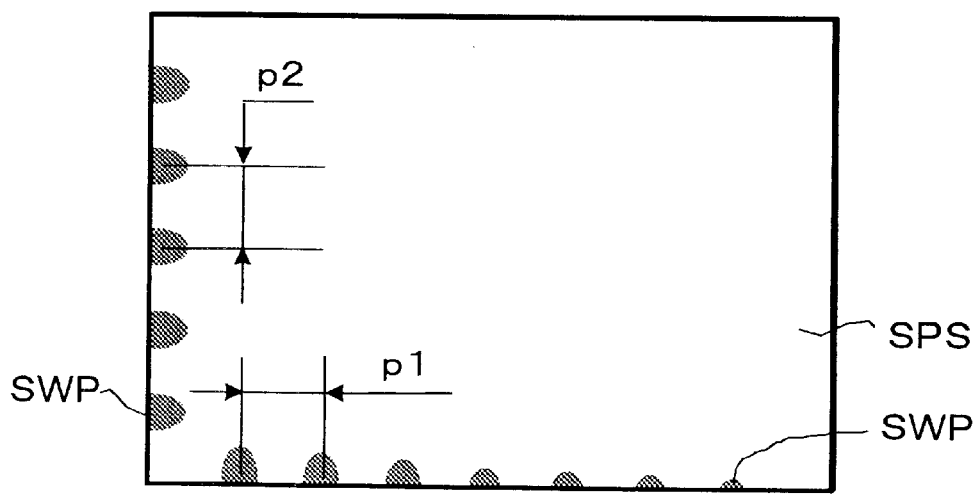
FIG. 7B is a schematic front view of the diffusion sheet SPS provided with other wavy patterns SWP for preventing wavy brightness irregularity according to the present invention.

FIG. 7A is a schematic front view of the liquid crystal display panel PNL which has the fluorescent tube LP arranged on its left side (on the side of gate drivers), and FIG. 7B is a schematic front view of the diffusion sheet SPS provided with the wavy pattern s SWP for preventing wavy brightness irregularity according to the present embodiment.

Figure 8A:
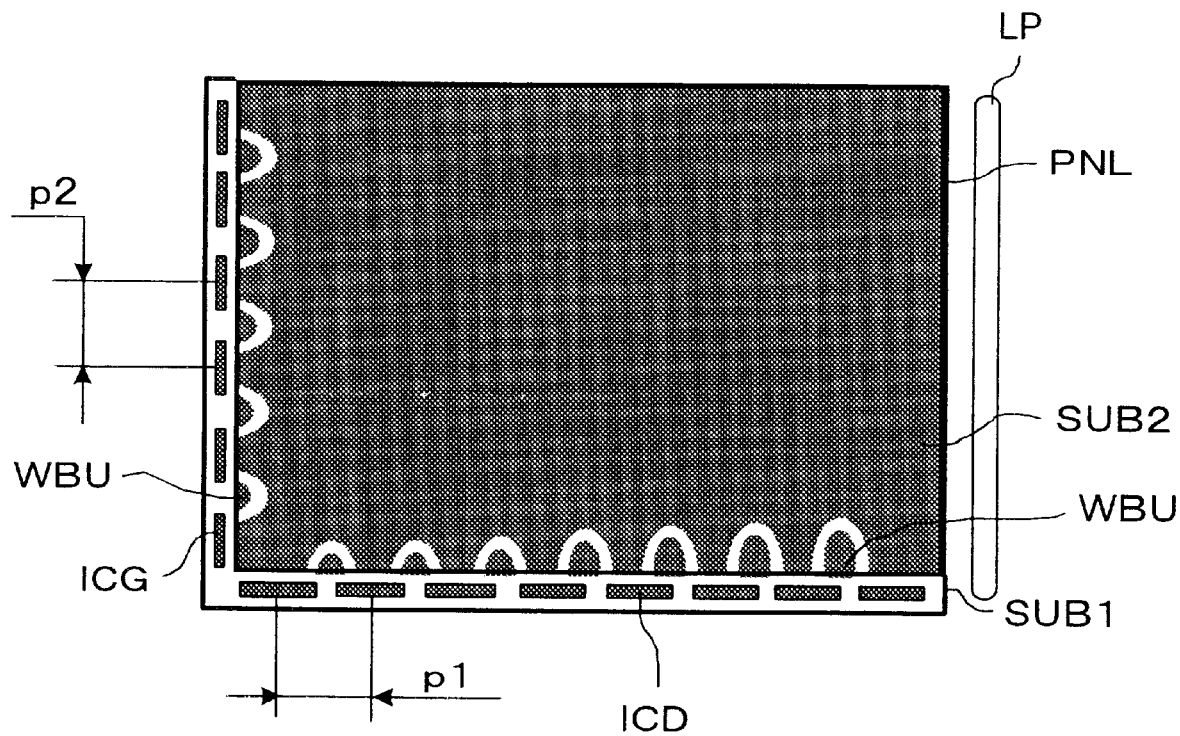
FIG. 8A is a schematic front view of the liquid crystal display panel PNL which has the fluorescent tube LP arranged on the side opposite to the gate drivers.
Figure 8B:
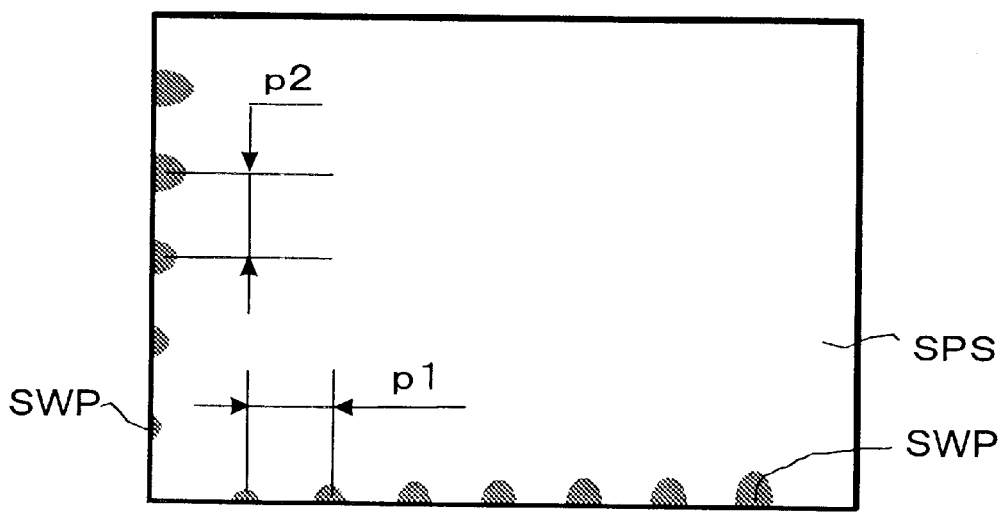
FIG. 8B is a schematic front view of the diffusion sheet SPS provided with other wavy patterns SWP for preventing wavy brightness irregularity according to the present invention.

FIG. 8A is a schematic front view of the liquid crystal display panel PNL which has the fluorescent tube LP arranged on its right side (on the side opposite to the drain drivers), and FIG. 8B is a schematic front view of the diffusion sheet SPS provided with the wavy patterns SWP for preventing wavy brightness irregularity according to the present embodiment.

In each of FIGS. 5A, 6A, 7A and 8A, symbols WBU denote wavy brightness irregularity which appears on the display screen of the liquid crystal display panel PNL if the present invention is not applied. In each of FIGS. 5B, 6B, 7B and 8B, symbols SWP denote wavy patterns for preventing wavy brightness irregularity which are arranged on the top surface of the diffusion sheet SPS (or on the bottom surface or both surfaces of the same). As described previously, there has heretofore been the problem that the wavy brightness irregularity WBU occurs on the display screen of the liquid crystal display panel PNL in the vicinity of the drivers ICG and ICD mounted on the substrate SUB1 and the display quality of the liquid crystal display panel PNL lowers. In the present embodiment, the wavy patterns SWP for preventing brightness irregularity are partially arranged on the diffusion sheet SPS according to the location, shape and brightness of the wavy brightness irregularity WBU shown in FIGS. 5A, 6A, 7A and 8A. Each of the wavy patterns SWP has a shape similar to the wavy brightness irregularity which occurs on the liquid crystal display panel PNL, i.e., a wavy shape which is convex toward the middle portion of the liquid crystal display panel PNL. The wavy patterns SWP are gradation patterns printed with, for example, white ink. As shown in FIG. 5C, each of these gradation patterns is low in density along its contour excluding its bottom side which is in contact with an edge side of the diffusion sheet SPS. Ink having a high optical transmittance is used. Incidentally, in FIGS. 5A, 6A, 7A and 8A, the boundary of the wavy brightness irregularity WBU is drawn with white lines to clarify the illustration of such boundary.

An art for forming dotted patterns for preventing brightness irregularity on a diffusion sheet is disclosed in, for example, the above-cited Japanese Patent Laid-Open No. 340613/1998. As described previously, in the present invention which shifts the arrangement of the centers of the respective drivers from the arrangement of the portions of the respective dotted patterns that are extended in the display area, it is possible to decrease a problematic brightness irregularity without impairing the brightness of the entire display area.

The occurrence of the wavy brightness irregularity WBU is more remarkable at a location closer to the fluorescent tube LP. Accordingly, the wavy patterns SWP are larger at locations closer to the fluorescent tube LP, on the left side of each of the liquid crystal display panels PNL of FIG. 5B and 6B as well as on the bottom side of each of the liquid crystal display panels PNL of FIGS. 7B and 8B. In addition, the wavy pattern SWP on the bottom side of the liquid crystal display panel PNL of FIG. 6B is formed to be small compared to FIG. 5B, and the wavy pattern SWP on the left side of the liquid crystal display panel PNL of FIG. 8B is formed to be small compared to FIG. 7B. This invention can also advantageously be applied to the art disclosed in the above-cited Japanese Patent Laid-Open No. 340613/1998.

In addition, not only are the wavy patterns SWP for preventing wavy brightness irregularity formed on the diffusion sheet SPS, but also the wavy brightness irregularity preventing patterns RPP are partially formed on the reflecting sheet RFS according to a location where wavy brightness irregularity occurs, as shown in FIG. 5D. Each of the wavy patterns SWP of the diffusion sheet SPS is formed in a wavy shape according to the shape of wavy brightness irregularity, but each of the patterns RPP of the reflecting sheet RFS is formed in a trapezoidal or rectangular shape (or any other shape) which is smaller in size than wavy brightness irregularity. The patterns RPP are gradation patterns printed by the use of, for example, gray ink (or another ink such as black ink). Although not shown, each of these gradation patterns is low in density along its contour excluding its bottom side which is in contact with an edge side of the reflecting sheet RFS (refer to FIG. 5C). Although in FIG. 5D the patterns RPP are formed on only the bottom side of the reflecting sheet RFS, the patterns RPP can, as a matter of course, be formed on the left side of the reflecting sheet RFS.

An art for forming dotted patterns for preventing brightness irregularity on a diffusion sheet is disclosed in, for example, the above-cited Japanese Patent Laid-Open No. 340612/1998, but by shifting the arrangement of the centers of the respective drivers from the arrangement of the portions of the respective dotted patterns, it is possible to decrease brightness irregularity to a remarkable extent without impairing the brightness of the entire display area.

In this manner, the wavy patterns SWP of the diffusion sheet SPS or the patterns RPP of the reflecting sheet RFS are arranged according to the location, shape and brightness of the wavy brightness irregularity WBU which occurs on the display screen of the liquid crystal display panel PNL due to the mounting of drivers (or TCPs), while taking account of a location at which to arrange the fluorescent tube LP. Accordingly, the wavy brightness irregularity WBU is canceled by being lowered in brightness, whereby it is possible to eliminate the difference in contrast between a portion in which the wavy brightness irregularity WBU occurs and a portion in which the wavy brightness irregularity WBU does not occur. Therefore, it is possible to reduce brightness irregularity and improve the display quality of the screen of the liquid crystal display device.

FIGS. 1 to 4 show the wavy patterns GWP for preventing wavy brightness irregularity which are formed on the light guide board GLB and FIGS. 5A, 6A, 7A and 8A shows the wavy patterns SWP for preventing wavy brightness irregularity formed on the diffusion sheet SPS, and moreover, the wavy brightness irregularity preventing patterns RPP formed on the reflecting sheet RFS are shown in FIG. 5D. However, all of these patterns may also be formed together, or arbitrary one or two of them may also be formed. In addition, wavy patterns similar to the wavy patterns SWP of the diffusion sheet SPS may also be formed on the reflecting sheet RFS. The wavy patterns GWP and SWP need not necessarily be wavy, and can perform a brightness irregularity reducing effect by being partially formed according to a location where wavy brightness irregularity occurs.

<<Prevention of Wavy Brightness Irregularity by TCP-mounted Type liquid Crystal Display Device>>

Figure 9A:
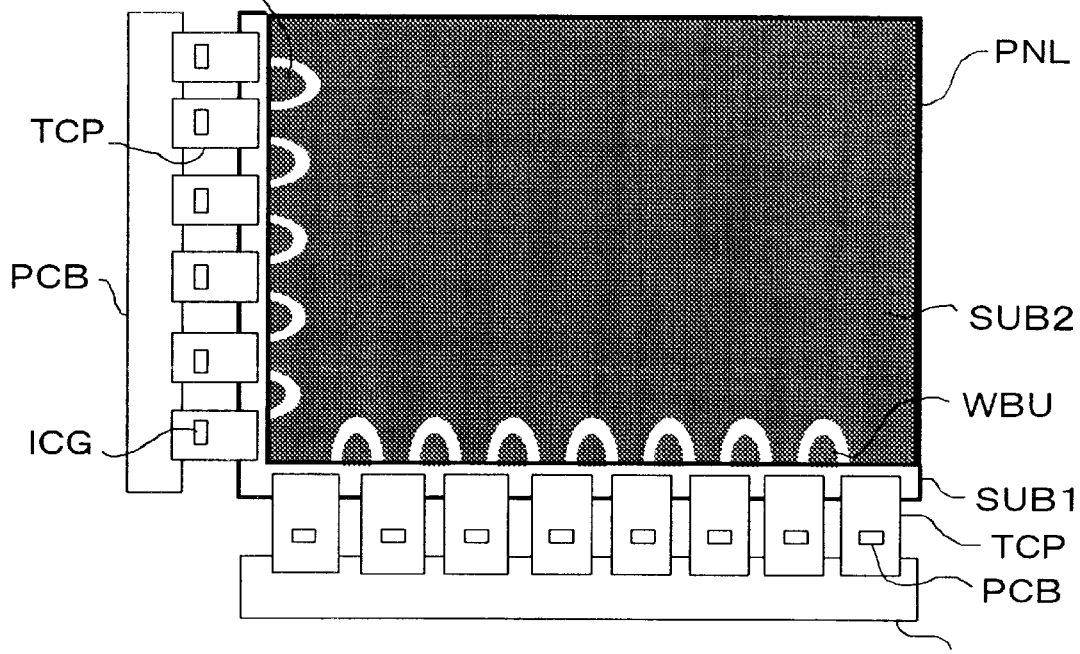
FIG. 9A is a schematic front view of the liquid crystal display panel PNL on which TCPs are mounted with the fluorescent tube LP being mounted on the top side of the liquid crystal display panel PNL (on the side opposite to drain drivers)
Figure 9B:
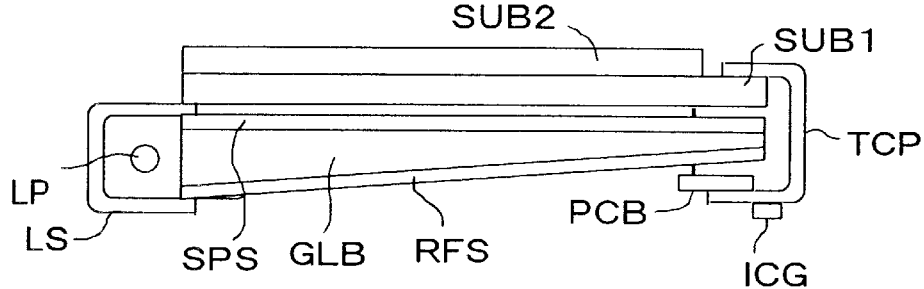
FIG. 9B is a schematic cross-sectional view of a liquid crystal display module corresponding to FIG. 9A.
Figure 9C:
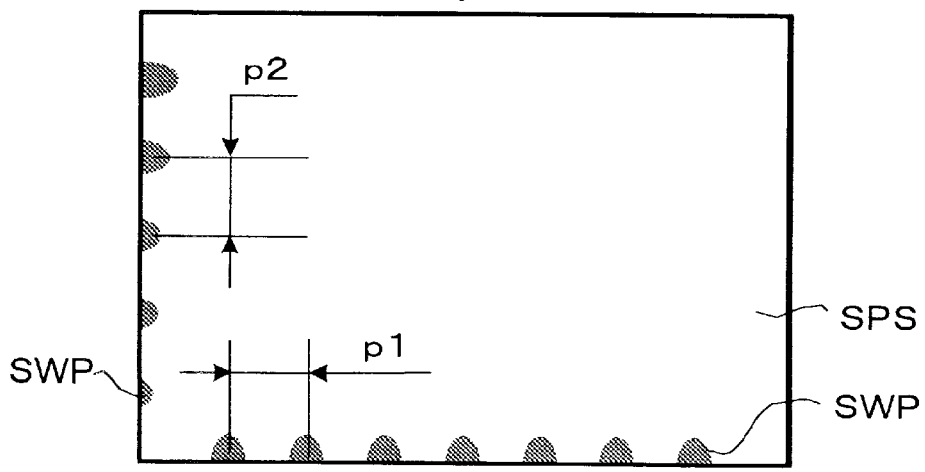
FIG. 9C is a schematic front view of the diffusion sheet SPS provided with the wavy patterns SWP for preventing wavy brightness irregularity according to the present embodiment.

FIG. 9A is a schematic front view of the liquid crystal display panel PNL on which TCPs are mounted with the fluorescent tube LP being mounted on the top side of the liquid crystal display panel PNL (on the side opposite to drain drivers). FIG. 9B is a schematic cross-sectional view corresponding to FIG. 9A (the illustration of part of the module constituent components is omitted). FIG. 9C is a schematic front view showing the wavy patterns SWP for preventing wavy brightness irregularity which are formed on the diffusion sheet SPS.

The present embodiment is applied to a TCP type of liquid crystal display device in which a plurality of TCPs provided with drivers are mounted on edge portions of the lower transparent glass substrate SUB1 which constitutes part of the liquid crystal display panel PNL. The construction of the other members is completely the same as the above-described FCA scheme embodiment. In the present embodiment as well, as a matter of course, the wavy patterns GWP for preventing wavy brightness irregularity may also be formed on the light guide board GLB as shown in FIG. 2, or the wavy brightness irregularity preventing patterns RPP may also be formed on the reflecting sheet RFS, as shown in FIG. 5D.

<<Method of Securing Diffusion Sheet SPS and Prism Sheet PRS>>

Two small holes for securing the diffusion sheet SPS and the two prism sheet PRS which are optical sheets are formed in an edge portion of one side of each of the sheets SPS and PRS, and during the installation of the sheets SPS and PRS, the position of the small holes of each of the sheets SPS and PRS coincides with that of the small holes of the next sheet to be installed. Pin-shaped projections MPN are respectively formed integrally with the lower case MCA which is manufactured by molding, at both ends of one side thereof at positions which correspond to those small holes.

The respective projections MPN are formed on the one side of the lower case MCA at both sides of each of the top and bottom of a part in which an inverter circuit for driving the back light BL is accommodated. During the installation of the diffusion sheet SPS and the prism sheets PRS, after the projections MPN are respectively inserted through these small holes, sleeves SLV through which to insert the respective projections MPN are respectively fitted onto the tips of the projections MPN, thereby securing the diffusion sheet SPS and the two prism sheets PRS. The sleeves SLV are made from an elastic body such as silicone rubber and have internal diameters smaller than those of the projections MPN, whereby the sleeves SLV are prevented from easily coming off.

In the present embodiment, in order to improve the accuracy of positioning and securing, at least one small hole is formed in an edge portion of another side of each of the optical sheets, and a pin-shaped projection which is formed integrally with an edge portion of another side of the lower case MCA is inserted through the at least one small hole. A pin-shaped projection MPN which is formed integrally with an edge portion of the side of the lower case MCA opposite to the back light BL is inserted through the additional one small hole of each of the optical sheets so that each of the sheets is positioned and secured by a total of three holes with high accuracy. This additional small hole and the pin-shaped projection. MPN are arranged on the bottom side of the transparent insulating substrate SUB1 and inside the periphery of the transparent insulating substrate SUB1, whereby the external shape of the liquid crystal display module is reduced. The pin-shaped projection MPN is located at a position which, in plan view, does not overlap the circuit board PCB. which is arranged under the gate side flexible circuit board FPC1. Accordingly, it is possible to form the pin-shaped projection MPN integrally with the lower case MCA without increasing the thickness of the liquid crystal display module.

According to this construction, the diffusion sheet SPS and the prism sheets PRS for back light are installed with good workability and are automatically positioned by the combination of the projections MPN and the small holes, whereby the diffusion sheet SPS and the prism sheets PRS can be positioned accurately and easily. Moreover, since one required sheet can easily be removed, only a defective sheet can be replaced so that reproduction (repair) of sheets or the like can easily be effected. Accordingly, it is possible to reduce a period of manufacturing time and improve workability, thereby reducing primary costs.

<<Arrangement and Position of Fluorescent Tube LP>>

As shown in FIG. 15A, in the module MDL, the elongate fluorescent tube LP is arranged in a space below the drain side flexible circuit board FPC2 and the drain side driver ICs which are mounted on a longer side of the liquid crystal display panel PNL (refer to FIG. 15A). Because of this construction, since it is possible to reduce the external dimensions of the module MDL, it is possible to reduce the size and weight of the module MDL, whereby it is possible to reduce manufacturing costs.

Figure 17:
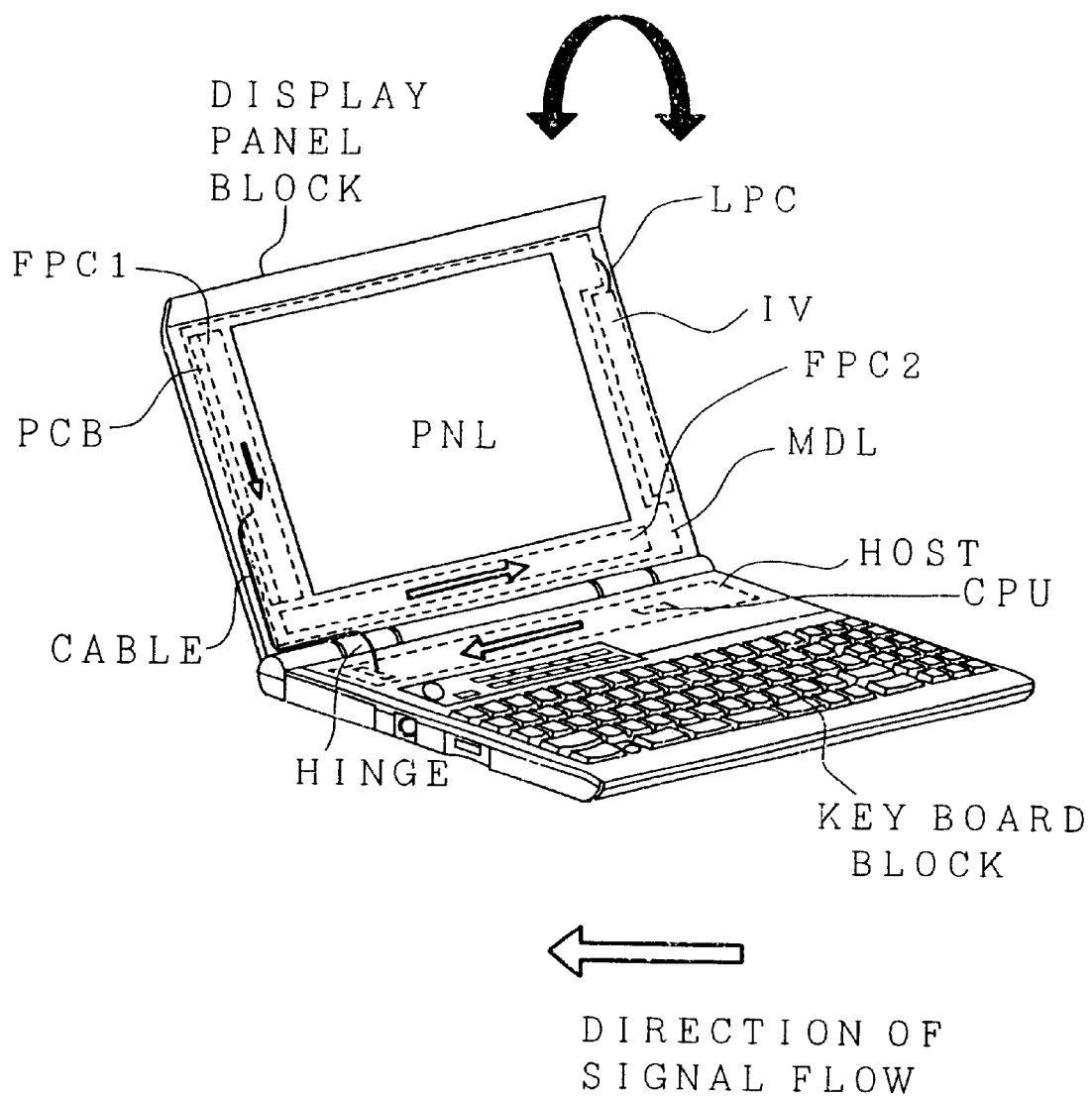
FIG. 17 is a perspective view of a notebook type of personal computer or word processor in which the liquid crystal display module is mounted.

The cold-cathode fluorescent tube LP of the back light BL is arranged on a longer side of the liquid crystal display module MDL which is the bottom side of the display of the same. Because of this construction, if the liquid crystal display module MDL is incorporated as a display part in an information processing apparatus such as a personal computer or a word processor, as shown in FIG. 17, the cold-cathode fluorescent tube LP is arranged on the bottom longer side of the display part. Incidentally, symbol LPC2 denotes a high-voltage lamp cable across which a high voltage of about 1,100 V is to be applied, and symbol LPC1 denotes a ground-voltage lamp cable. The present example is a case in which an inverter circuit IV is arranged in an inverter accommodating part within the display part. As will be described later in detail, the lamp cable LPC1 is wired along the left and top sides of the liquid crystal display module MDL, while the lamp cable LPC2 is wired along the right side of the liquid crystal display module MDL, and both lamp cables LPC1 and LPC2 are drawn out from a top portion of the right side. Otherwise, the inverter circuit IV may also be arranged in the keyboard part of the information processing apparatus. In this case, the lamp cable LPC1 is wired along the left, top and right sides of the liquid crystal display module MDL, and both lamp cables LPC1 and LPC2 are drawn out from a bottom portion of the right side.

Because the cold-cathode fluorescent tube LP is arranged on the bottom side of the display of the liquid crystal display module MDL, even if the inverter circuit IV is to be arranged in the keyboard part of the information processing apparatus, the high voltage lamp cable LPC2 of the cold-cathode fluorescent tube LP can be reduced in length. Accordingly, it is possible to lower impedance which induces occurrence of noise or a variation in waveform, whereby it is possible to improve the starting characteristics of the cold-cathode fluorescent tube LP. Incidentally, if the inverter circuit IV is arranged in the keyboard part, the width of the display part can be reduced to a further extent. In addition, as compared with a case in which the cold-cathode fluorescent tube LP is arranged on the top side of the display of the liquid crystal display module MDL, the cold-cathode fluorescent tube LP is improved in reliability because the cold-cathode fluorescent tube LP is not easily exposed to a shock due to the opening or closing of the display part of FIG. 17. In addition, since the center of the liquid crystal display panel PNL (the display screen) is shifted upward from the center of the display part as shown in FIG. 17, it is possible to prevent a user from hiding the bottom portion of the display screen with his/her hands during typing on the keyboard.

Figure 15:
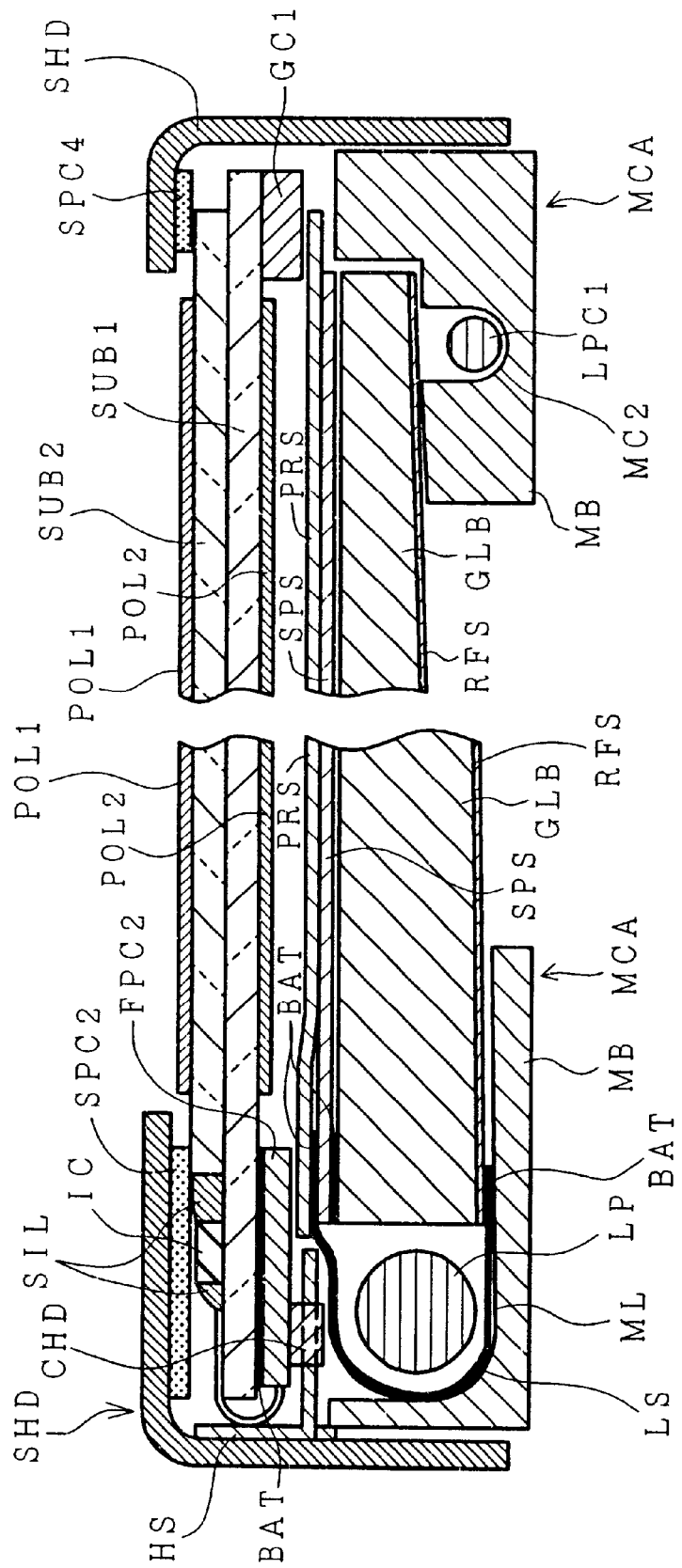
FIG. 15 is a cross-sectional view of a portion corresponding to line A–A' of FIG. 10.

In addition, as is apparent from FIG. 15, on the top side of the display, since the lamp cable LPC1 passes below the light guide board GLB, the longitudinal length can be reduced.

Incidentally, the cold-cathode fluorescent tube LP may also be installed on a shorter side of the light guide board GLB.

<<Multi-layered Flexible Circuit Boards FPC1 and FPC2>>

Figure 11:
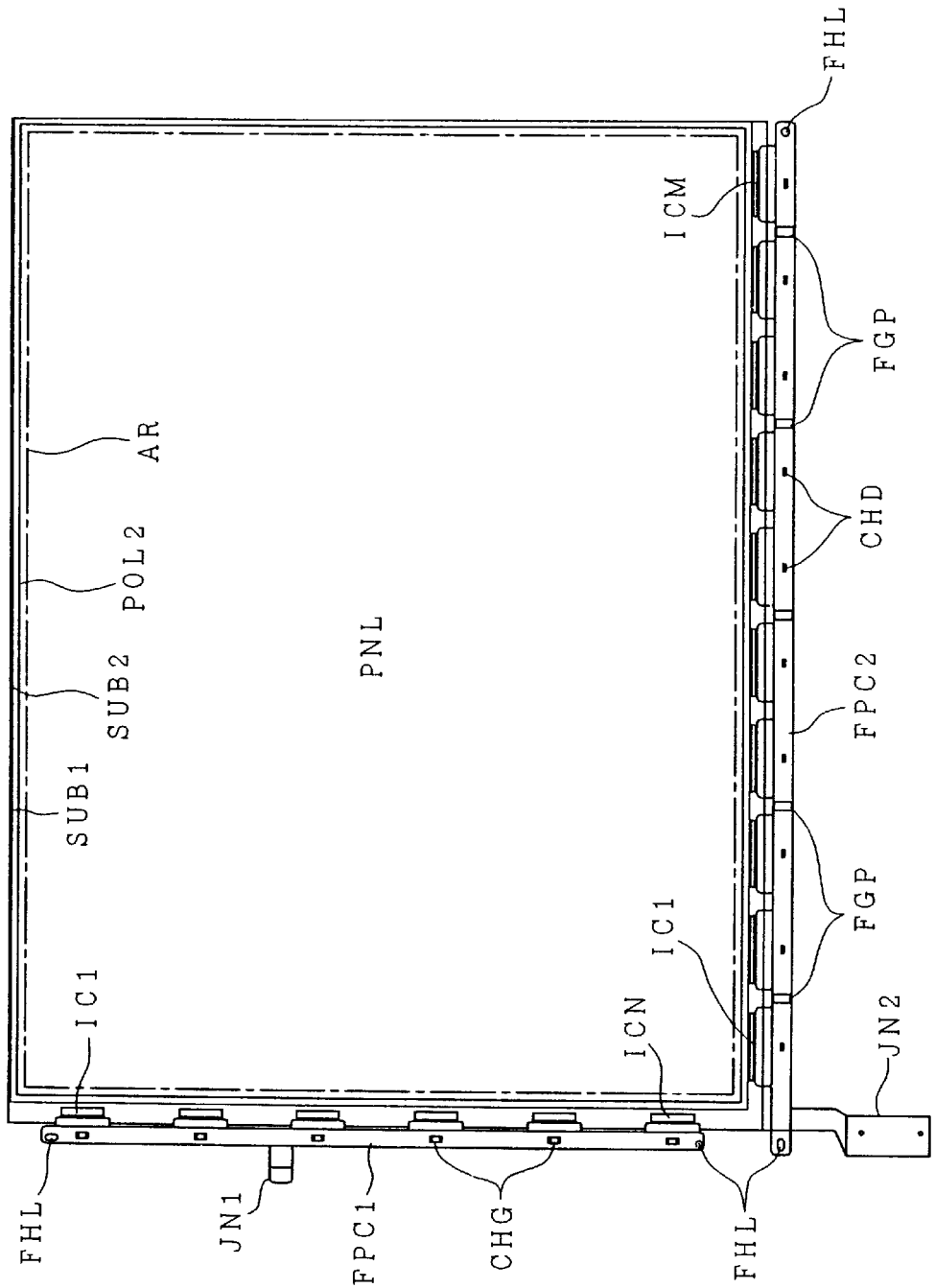
FIG. 11 is a front view of a driving circuit-equipped liquid crystal display panel in which a gate side flexible circuit board FPC1 and a drain side flexible circuit board FPC2 which has not yet been bent are mounted on the periphery of the liquid crystal display panel PNL.
Figure 12A:
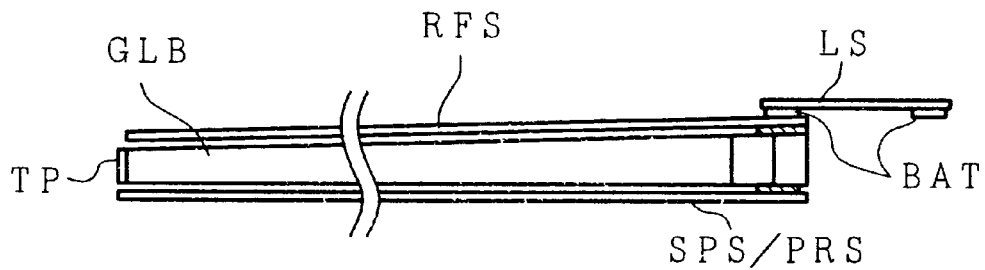
FIG. 12A is a front view of a back light before a reflecting sheet LS is bent.
Figure 12B:
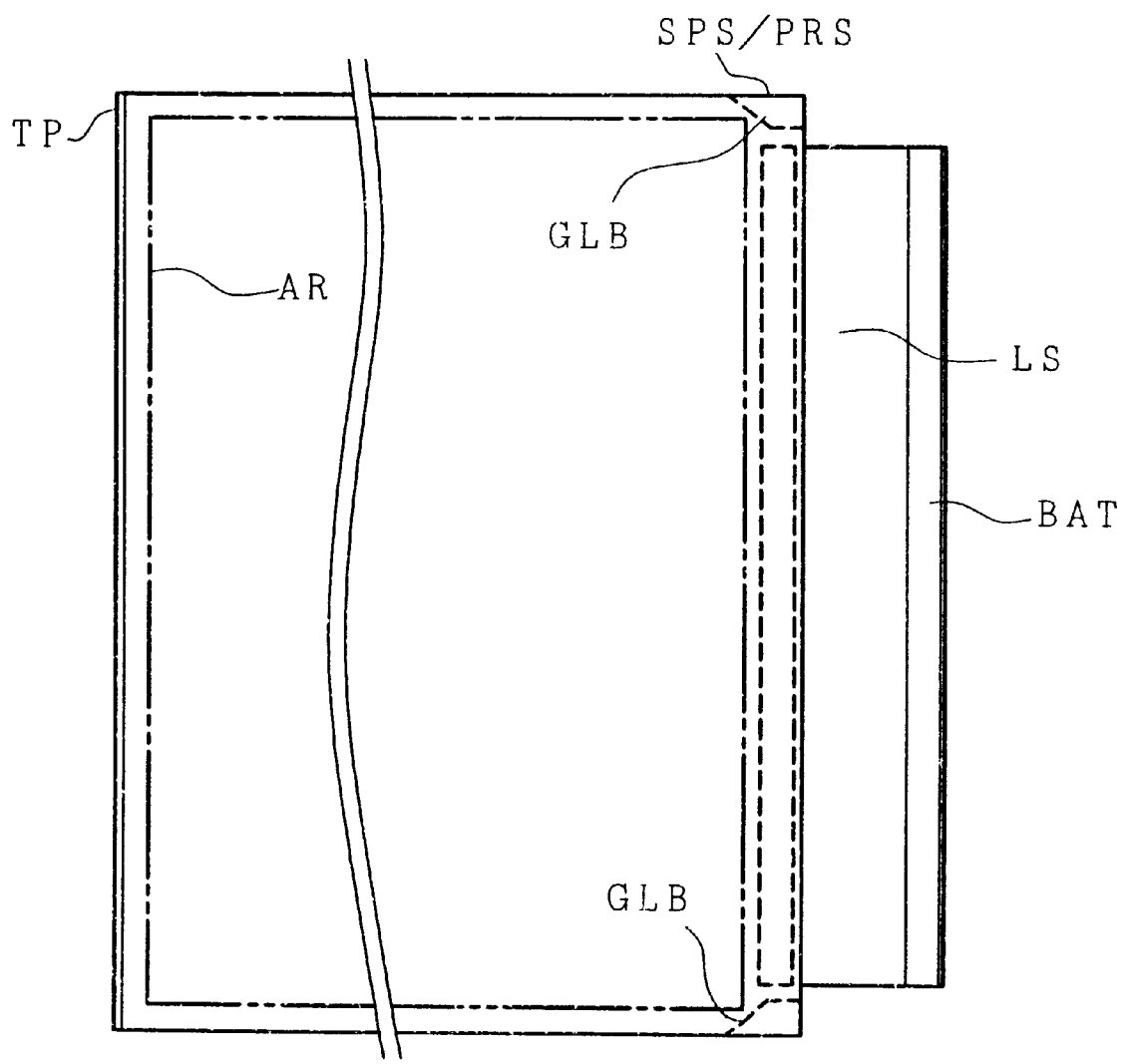
FIG. 12B is a side view of the same.

FIG. 11 is a front view of a driving circuit board-equipped liquid crystal display panel in which the gate side flexible circuit board FPC1 and the drain side flexible circuit board FPC2 which has not yet been bent are mounted on the periphery of the liquid crystal display panel PNL.

The six IC chips shown on the left side of FIG. 11 are driver ICs for a vertical scanning circuit, while the ten IC chips shown on the bottom side of FIG. 11 are driver ICs for a video signal driving circuit, and all of the driver IC chips are chip-on-glass-mounted (COG-mounted) on a transparent insulating substrate with the use of an anisotropic conductive layer (ACF2 in FIG. 14) or an ultraviolet rays hardener or the like. In a conventional method, tape carrier packages (TCPs) on which driver IC chips are mounted by tape automated bonding (TAP) are connected to the liquid crystal display panel PNL by using an anisotropic conductive layer. In the case of COG mounting, since driver ICs are directly used, the aforementioned TAB step becomes unnecessary to reduce the entire process, and moreover, a tape carrier also becomes unnecessary to realize the effect of reducing primary costs. Moreover, COG mounting is suited to mounting techniques for the high-definition and high-density liquid crystal display panel PNL. Specifically, in the present embodiment, a TFT liquid crystal display module having a 12.1-inch screen size of 800×3×600 dots is designed as an SVGA panel. For this reason, the size of each of red (R), green (G) and blue (B) dots is made 307.5 $\mu$m (gate-line interval)×102.5 μm (drain-line interval), and one pixel is made of a combination of three color dots, red (R), green (G) and blue (B) and has a size of 307.5 μm×307.5 μm. For this reason, if the number of the drain side terminal lines DTM is made 800×3, the interval between adjacent terminal lines becomes not greater than 100 μm which is a presently usable connection interval limit in TCP-mounting. On the other hand, in the case of COG mounting, although depending on the material of an anisotropic conductive layer to be used, such presently usable minimum value is about 70 μm with regard to the interval between adjacent bumps BUMP of the driver ICs (refer to FIG. 14), and about 50 μm×about 50 μm with regard to the area of intersection with each base interconnection line. For this reason, in the present embodiment, drain driver ICs are arranged in a row on a longer side of the liquid crystal display panel PNL, and drain lines are draw out on the longer side. Accordingly, the interval between adjacent bumps BUMP of the driver ICs (refer to FIG. 14) and the area of intersection with each base interconnection line can be designed to be about 70 μm and about 50 μm×about 50 μm, respectively, whereby it is possible to provide a far more reliable connection with each base interconnection line. Since the interval between adjacent gate lines is large enough (307.5 μm), the gate side terminal lines GTM are drawn out on a shorter side of the liquid crystal display panel PNL. However, in the case of a higher-definition liquid crystal display panel, the gate side terminal lines GTM can also be alternately drawn out on its two opposite shorter sides.

In the method of alternately drawing out the drain lines or the gate lines, as described previously, the connection between the terminal lines DTM or GTM and the output-side bumps BUMP of the driver ICs can easily be realized, but it becomes necessary to arrange peripheral circuit boards on the periphery of the opposite two longer sides of the liquid crystal display panel PNL, leading to the problem that the external size of the liquid crystal display module becomes larger than a module using a liquid crystal display panel on one side of which the drain or gate lines are drawn out. If the number of display colors are increase, the number of data lines for display data increases and the maximum external size of the information processing apparatus increases. For this reason, in the present embodiment, the multilayered flexible circuit boards are used so that the drain lines are drawn out on only one side, thereby solving the conventional problem.

<<Driving Circuit Board-Equipped Liquid Crystal Display Panel ASB>>

The driving circuit board-equipped liquid crystal display panel ASB will be described below.

As shown in FIG. 15A, the drain driver flexible circuit board PFC2 is bonded in a bent state to the surface of the transparent insulating substrate SUB1 opposite to the pattern-formed surface thereof. Polarizers POL1 and POL2 are arranged slightly (about 1 mm) externally of an effective pixel area AR, and an end portion of FML of the circuit board PFC2 is positioned about 1 to 2 mm away from there. The distance from an end of the transparent insulating substrate SUB1 to the projecting end of the bent portion of the flexible circuit board PFC2 is as small as about 1 mm, and compact mounting is enabled. Accordingly, in the present embodiment, the distance from the effective pixel area AR to the projecting end of the bent portion of the flexible circuit board PFC2 becomes about 7.5 mm.

<<Information Apparatus in which Liquid Crystal Display Module MDL>>

FIG. 17 is a perspective view of a notebook type of personal computer or word processor in which the liquid crystal display module MDL is mounted. FIG. 17 shows a case in which the inverter IV is arranged in a display part, i.e., an inverter accommodating part of the liquid crystal display module MDL.

By adopting the COG-mounting of the driver ICs on the liquid crystal display panel PNL and by adopting the multilayered flexible circuit boards as peripheral circuits for the drain and gate drivers on the periphery of the liquid crystal display panel PNL, as well as by adopting bending-mounting for the peripheral circuit for the drain drivers, the external size of the information apparatus can be reduced to a great extent compared to the prior art. In the present embodiment, since the peripheral circuit for the drain drivers which is mounted on one side of the liquid crystal display panel PNL can be arranged on the top side of the display part located above the hinge of the information apparatus, compact mounting is enabled.

A signal from the information apparatus is first transmitted to a display control integrated circuit element (TCON) from a connector which is located approximately at the middle of the interface circuit board PCB on the left side as viewed in FIG. 17, and display data obtained from data conversion in the display control integrated circuit element (TCON) flows to the peripheral circuit for the drain drivers. In this manner, by using the FCA scheme and the multilayered flexible circuit boards, it is possible to solve limitations on the external shape of the information apparatus in the direction of the lateral width thereof, thereby making it possible to provide an information apparatus having a small size and low power consumption.

<<Plane and Cross-Sectional Constructions of Vicinity of Portion on Which Driver IC Chips are Mounted>>

Figure 13:
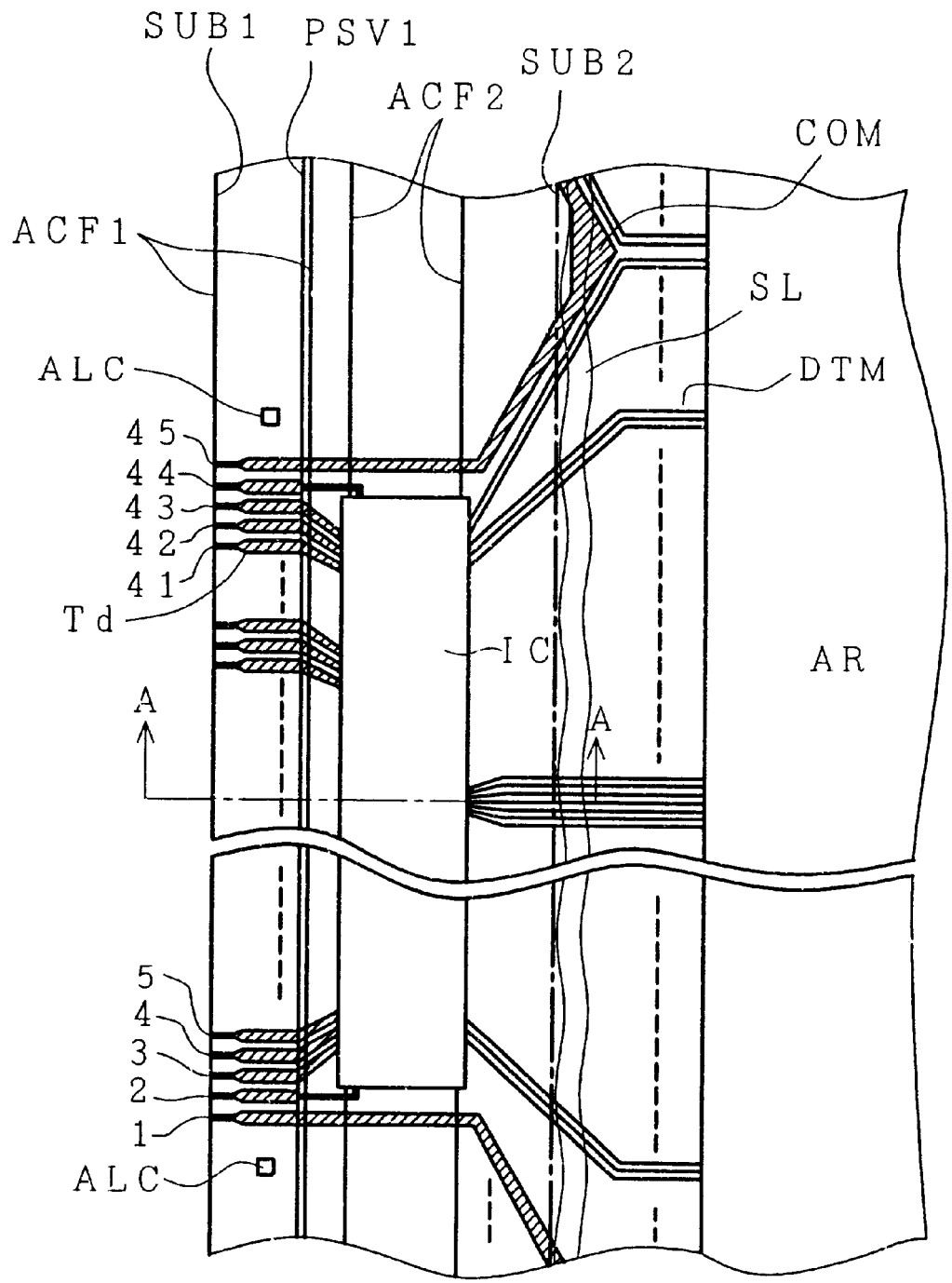
FIG. 13 is a plan view showing the state in which a driver IC is mounted on a transparent insulating substrate SUB1 of the liquid crystal display panel.
Figure 14:
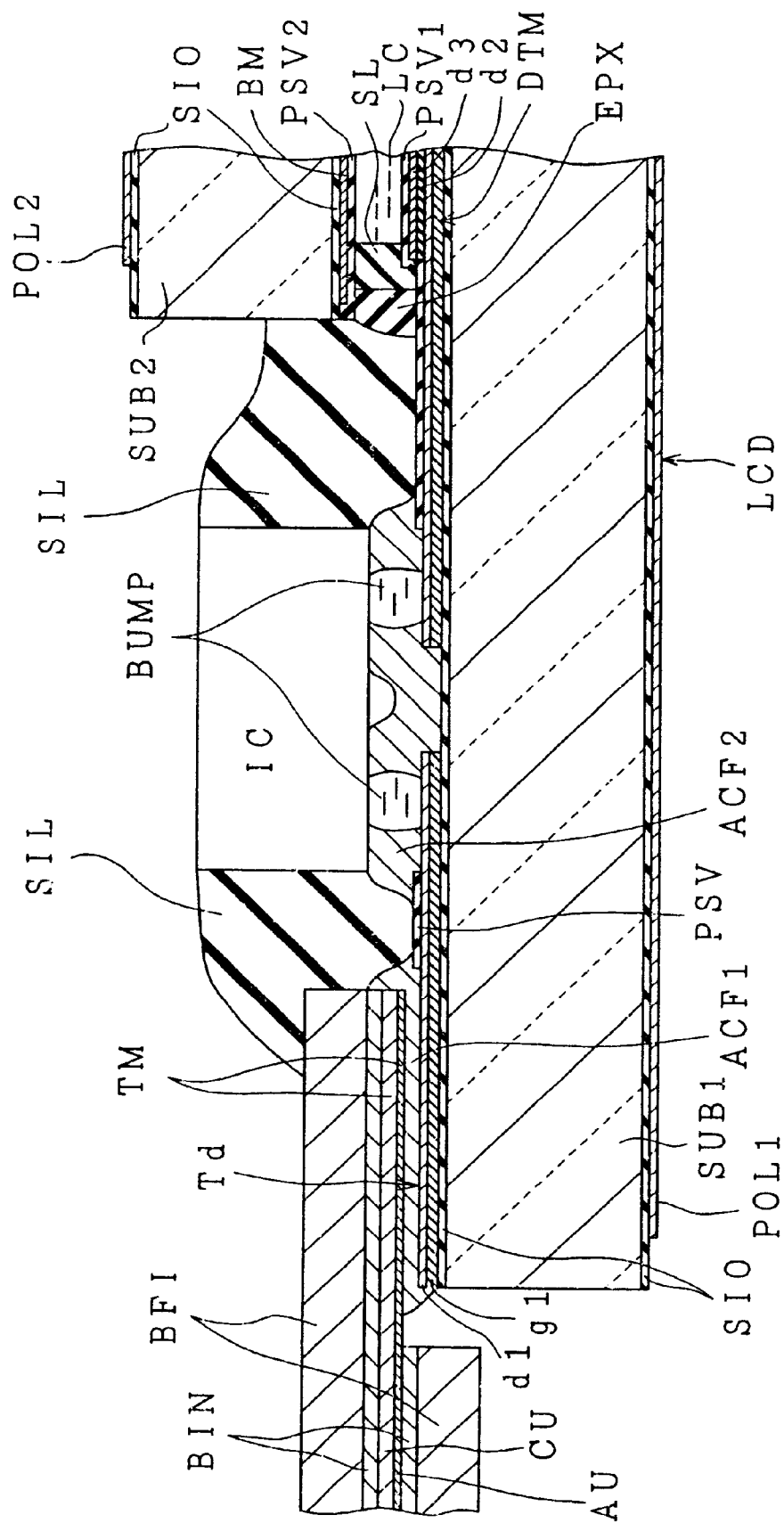
FIG. 14 is a cross-sectional view taken along line A—A of FIG. 13.

FIG. 13 is a plan view showing the state in which a driver IC is mounted on the transparent insulating substrate SUB1 made of, for example, glass. A cross-sectional view taken along line A—A of FIG. 13 is shown in FIG. 14. In FIG. 13, another transparent insulating substrate SUB2 is shown by a dot-dashed line, and is positioned to be superposed on the transparent insulating substrate SUB1 to seal a liquid crystal LC as well as the effective display area (effective screen area) AR by means of a seal pattern SL (refer to FIG. 13). An electrode COM on the transparent insulating substrate SUB1 is a line which is electrically connected to a common electrode pattern of the transparent insulating substrate SUB2 via conductive beads, a silver paste or the lie. The lines DTM (or GTM) are provided for supplying an output signal from the driver IC to the lines inside the effective display portion AR. Input lines Td are provided for supplying an input signal to the driver IC. In an anisotropic conductive layer ACF, a layer ACF1 and a layer ACF2 are bonded separately from each other. The layer ACF2 has an elongate shape common to plural driver IC portions which are arranged in a line, and the layer ACF1 has an elongate shape common to input line pattern portions for the respective plural driver IC portions. As shown in FIG. 14 as well, passivation layers (protective films) PSV1 and PSV are formed to cover an interconnection portion as completely as possible for the purpose of, preventing electrolytic corrosion, and exposed portions are covered with the anisotropic conductive layer ACF1.

Moreover, a portion which surrounds the sides of the driver IC is charged with an epoxy or silicone resin SIL (refer to FIG. 14) to realize multiple protection.

Although the present invention has been specifically described above with reference to the embodiments, the present invention is not limited to any of the above-described embodiments and various modifications can, of course, be made without departing from the gist of the present invention. Needless to say, the present invention can also be applied to, for example, simple matrix liquid crystal display devices, vertical and lateral electric field types of active matrix liquid crystal display devices, and FCA scheme or TCP scheme liquid crystal display devices.

As described hereinabove, in accordance with the present invention, it is possible to reduce wavy brightness irregularity which occurs in a display screen edge portion in the vicinity of drivers or TCPs due to the mounting thereof, thereby making it possible to make far higher the image quality of the liquid crystal display device.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device comprising:

a liquid crystal display panel having a pair of substrates being superposed one on another, a liquid crystal layer sealed therebetween, drive elements or tape carrier packages being mounted on an end of the one of the pair of substrates so as to be juxtaposed with each other along the end of one of the pair of substrates;

an optical guide plate being disposed along one of surface sides of the liquid crystal display panel;

a linear shaped light source being disposed at one side of the optical guide plate;

an optical diffusing sheet being disposed between the one of surface sides of the liquid crystal display panel and the optical guide plate;

an optical reflecting sheet being disposed at an opposite side of the optical guide plate to the one of surface sides of the liquid crystal display panel; and a pattern for preventing brightness irregularity from appearing in a display screen area of the liquid crystal display panel, which has a plurality of regions being formed on at least one edge of at least one of the optical guide plate, the optical diffusing sheet, and the optical reflecting sheet and being juxtaposed along the at least one edge thereof, and each of the plurality of regions is extended towards the display screen area and confronts an area lying between a pair of the drive elements of the tape carrier packages.

2. A liquid crystal display device according to claim 1, wherein said pattern on said optical guide plate, said optical diffusing sheet, or said optical reflecting sheet has a wavy shape which is convex toward a middle portion of said liquid crystal display panel.

3. A liquid crystal display device according to claim 1, wherein said pattern is a gradation pattern whose density gradually varies.

4. A liquid crystal display device according to claim 1, wherein said pattern on said optical guide plate, said optical diffusing sheet, or said optical reflecting sheet is a gradation pattern which is low in density in the vicinity of its contour excluding a bottom side of said pattern which is in contact with said one edge.

5. A liquid crystal display device comprising:

a liquid crystal display panel having a pair of substrates being superposed one on another, a liquid crystal layer sealed therebetween, drive elements or tape carrier packages being mounted on an end of the one of the pair of substrates so as to be juxtaposed with each other along the end of one of the pair of substrates;

an optical guide plate being disposed along one of surface sides of the liquid crystal display panel;

a linear shaped light source being disposed at one side of the optical guide plate;

an optical diffusing sheet being disposed between the one of surface sides of the liquid crystal display panel and the optical guide plate;

an optical reflecting sheet being disposed at an opposite side of the optical guide plate to the one of surface sides of the liquid crystal display panel; and a pattern for preventing brightness irregularity from appearing in a display screen area of the liquid crystal display panel, the pattern has a plurality of regions being formed on an edge of at least one of the optical guide plate, the optical diffusing sheet, and the optical reflecting sheet and being juxtaposed along the at least one edge thereof, the edge of the at least one of the light guide plate, the optical diffusing sheet, and the optical reflecting sheet is extended from the one side of the optical guide plate where the linear shaped light source is disposed, and the plurality of regions are extended towards the display screen area respectively and respective extension lengths thereof are reduced in accordance with distances from the one side of the optical guide plate to the plurality of regions respectively.

6. A liquid crystal display device according to claim 5, wherein the pattern on the optical guide plate, the optical diffusing sheet, or the optical reflecting sheet has a wavy shape which is convex toward a middle portion of the liquid crystal display panel.

7. A liquid crystal display device according to claim 5, wherein the pattern is a gradation pattern whose density gradually varies.

8. A liquid crystal display device according to claim 5, wherein the pattern on the optical guide plate, the optical diffusing sheet, or the optical reflecting sheet is a gradation pattern which is low in density in the vicinity of its contour excluding a bottom side of the pattern which is in contact with the one edge.

* * * * *